US008584260B2

(12) United States Patent
Umezu

(10) Patent No.: US 8,584,260 B2
(45) Date of Patent: Nov. 12, 2013

(54) INFORMATION PROCESSING SYSTEM, INFORMATION PROCESSING APPARATUS, AND COMPUTER-READABLE STORAGE MEDIUM HAVING STORED THEREIN INFORMATION PROCESSING PROGRAM

(75) Inventor: Ryuji Umezu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 872 days.

(21) Appl. No.: 12/155,794

(22) Filed: Jun. 10, 2008

(65) Prior Publication Data

US 2008/0311995 A1 Dec. 18, 2008

(30) Foreign Application Priority Data

Jun. 13, 2007 (JP) ................................. 2007-156604

(51) Int. Cl.
*G06F 21/10* (2013.01)
(52) U.S. Cl.
USPC .................... 726/31; 726/26; 726/32; 463/43; 463/44
(58) Field of Classification Search
CPC ...................................................... G06F 21/10
USPC ...................................................... 726/32, 31
See application file for complete search history.

(56) References Cited

U.S. PATENT DOCUMENTS

| 5,592,651 | A | 1/1997 | Rackman |
| 6,267,678 | B1 * | 7/2001 | Kubo et al. ...................... 463/44 |
| 6,342,892 | B1 * | 1/2002 | Van Hook et al. ............. 345/503 |
| 6,535,981 | B1 * | 3/2003 | Shimizu ........................... 726/26 |
| 6,544,126 | B2 * | 4/2003 | Sawano et al. ................... 463/42 |
| 6,604,103 | B1 * | 8/2003 | Wolfe .................................... 1/1 |
| 6,721,891 | B1 | 4/2004 | Borza |
| 2005/0010788 | A1 * | 1/2005 | Craft ............................ 713/187 |

FOREIGN PATENT DOCUMENTS

| JP | 63-213027 | 9/1988 |
| JP | 11-53183 | 2/1999 |
| JP | 2001-154839 | 6/2001 |
| JP | 2003-122581 A | 4/2003 |
| JP | 2005-196466 | 7/2005 |

OTHER PUBLICATIONS

Dipert—Variations of a theme. EDN. Jan. 19, 2006. http://www.edn.com/contents/images/6298268.pdf.*
Harris, Craig—Nintendo DS Feature a Day #6. IGN Entertainment. Nov. 2004. http://ds.ign.com/articles/566/566611p1.html.*
European Search Report issued for European Patent Application No. 08010549.7—2212/2003584, dated Jul. 20, 2012.

\* cited by examiner

*Primary Examiner* — Jung Kim
*Assistant Examiner* — Ngoc D Nguyen
(74) *Attorney, Agent, or Firm* — Nixon & Vanderhye, P.C.

(57) ABSTRACT

A storage medium includes an ID registration area for storing therein a main body ID which is an ID unique to an information processing apparatus. The information processing apparatus has the main body ID stored therein. The information processing apparatus includes copying means for, when the storage medium is attached thereto, copying a program stored in the storage medium thereinto in the case where the main body ID has not yet been registered. When the copy is made, the main body ID is stored into the ID registration area of the storage medium. The information processing apparatus also includes execution program selecting means for selecting, from the copied program and from the program stored in the storage medium, a program to be executed.

13 Claims, 18 Drawing Sheets

F I G. 1
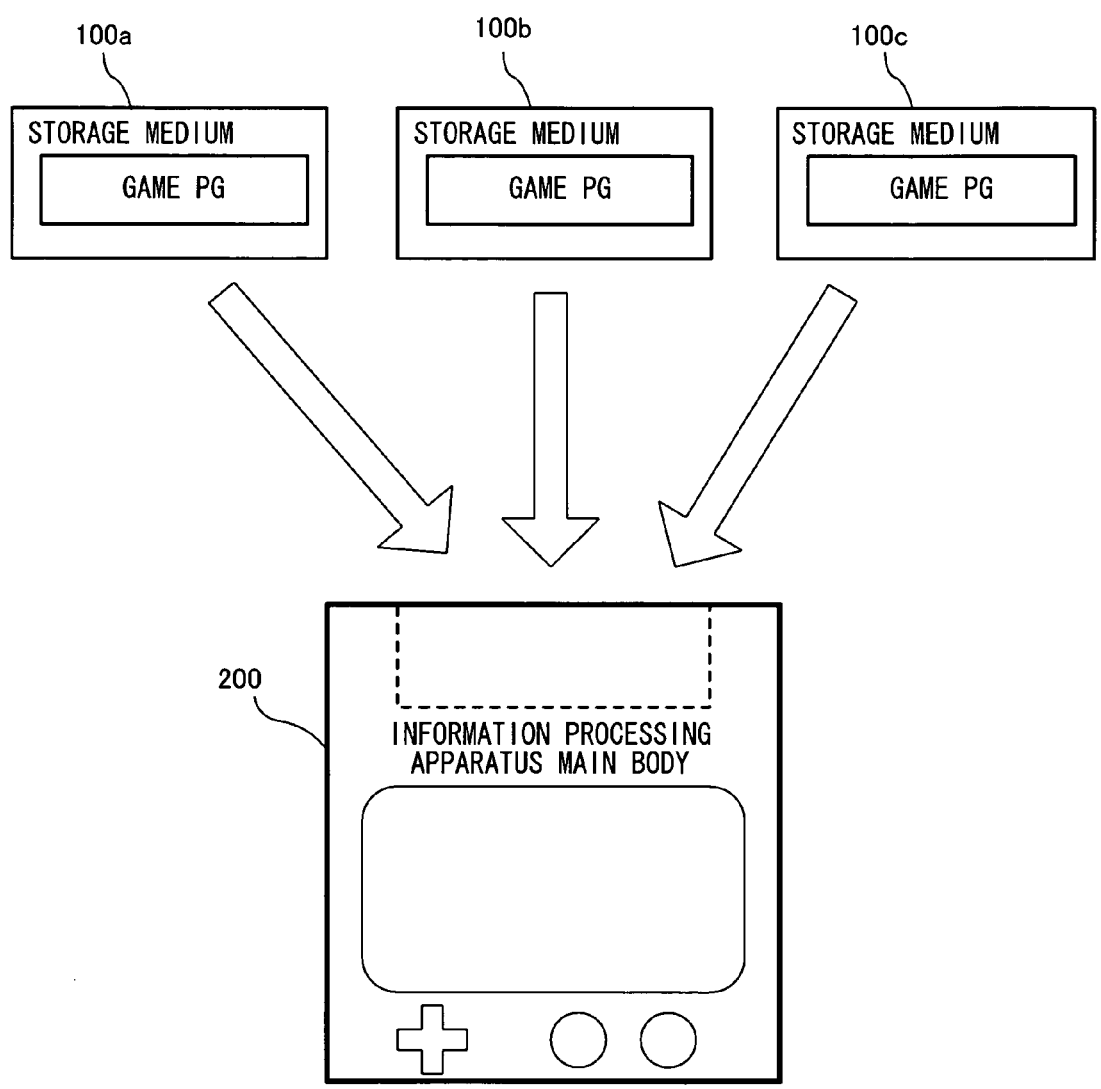

F I G. 4
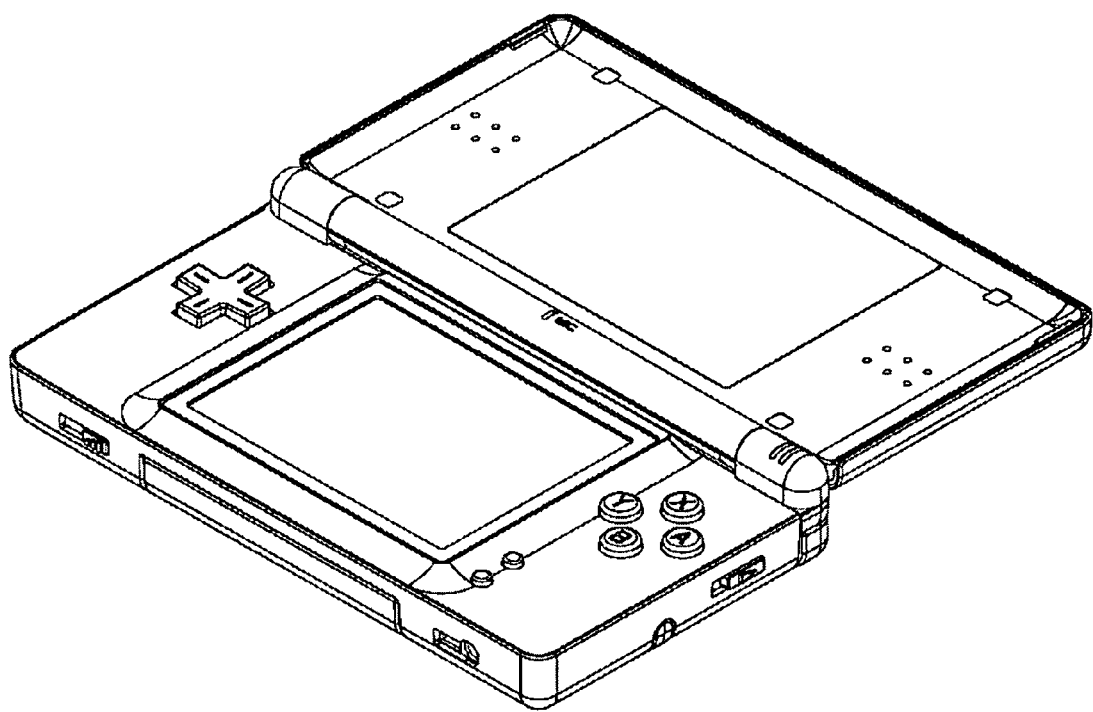

F I G. 1 9
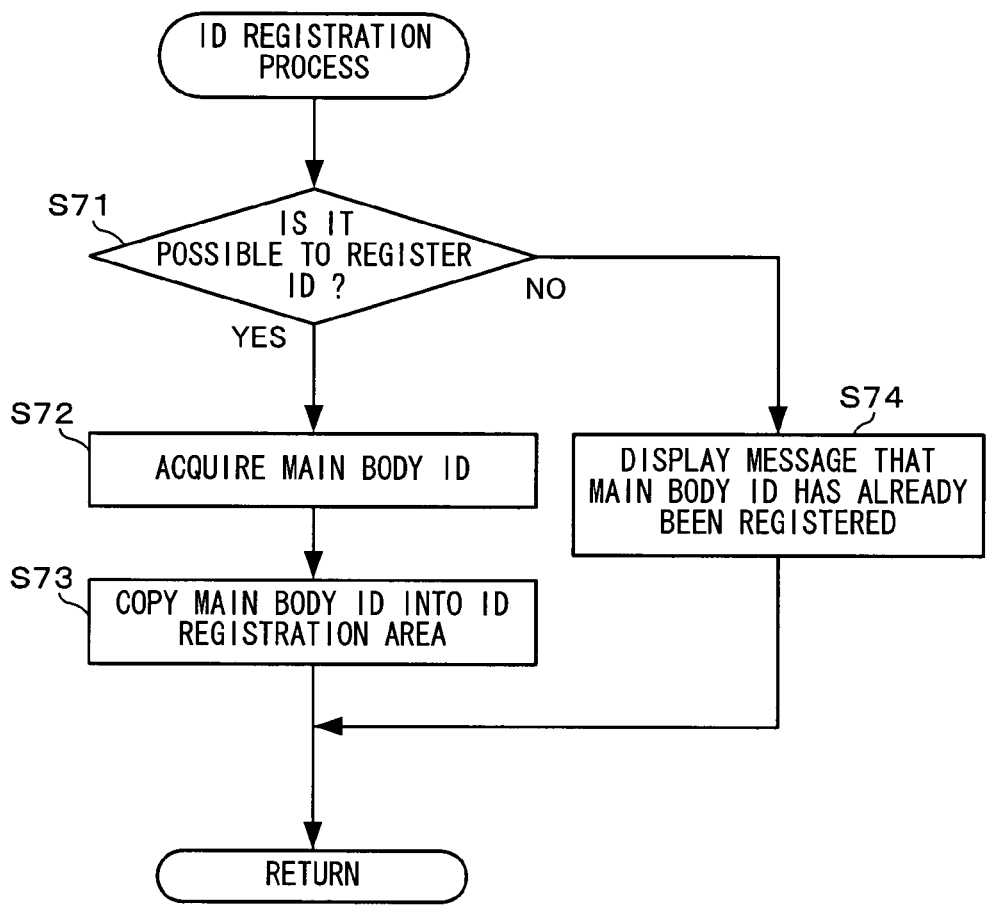

INFORMATION PROCESSING SYSTEM, INFORMATION PROCESSING APPARATUS, AND COMPUTER-READABLE STORAGE MEDIUM HAVING STORED THEREIN INFORMATION PROCESSING PROGRAM

CROSS REFERENCE TO RELATED APPLICATION

The disclosure of Japanese Patent Application No. 2007-156604, filed on Jun. 13, 2007, is incorporated herein by reference.

BACKGROUND OF THE INVENTION

1. Field of the Invention

The present invention relates to an information processing system including a computer-readable program storage medium and an information processing apparatus capable of attaching the computer-readable program storage medium thereto, and particularly relates to the copying of a program and the execution of a program.

2. Description of the Background Art

Conventionally, there is a method of allowing only a specific user to copy a predetermined program or execute a predetermined program. For example, a copy protection method using a medium having stored therein software including an ID number storage area and also using a computer system including an ID number storage device is disclosed (e.g., Japanese Laid-Open Patent Publication No. 63-213027). In this method, the software stored in the medium is copied into a secondary storage device provided in the computer system. At this time, the copy is made by embedding the ID number stored in the ID number storage device into the ID number storage area. As a result, even when a copy is attempted to be made into another computer system using the copy medium, the ID number of the ID number storage area does not match the ID number of the ID number storage device of said another computer system, and thus the copy cannot be made to said another computer system.

Further, a method using identification information unique to a device is also disclosed (e.g., Japanese Laid-Open Patent Publication No. 11-53183). For example, a storage medium including a read-only area and a writable area is attached to a game apparatus. Then, identification information unique to the game apparatus is written into the writable area. This method compares the identification information written in the storage medium to the identification information stored in the game apparatus main body and changes the process contents of the game program depending on whether or not the identification information written in the storage medium matches the identification information stored in the game apparatus main body.

Further, a method of providing in a storage medium a non-volatile memory having a virgin code written therein when the storage medium has not yet been used and of, when an information processing apparatus to which the storage medium is attached detects the virgin code, writing an ID code of the information processing apparatus into the storage medium is also disclosed (e.g., Japanese Laid-Open Patent Publication No. 2001-154839). The information processing apparatus does not read a program from the storage medium which does not have stored therein the ID code of the information processing apparatus. Consequently, it is possible to execute the program in only the information processing apparatus of which the ID code has been registered into the storage medium.

However, conventionally, the above-described methods and information processing apparatuses have the following problems. In the method disclosed in Japanese Laid-Open Patent Publication No. 63-213027, from a medium from which a copy has once been made to a device, another copy cannot be made to any other device except for the device to which the copy has been made. Further, a program cannot be started up directly from the medium, either. Additionally, in the information processing apparatuses disclosed in Japanese Laid-Open Patent Publication No. 11-53183 and Japanese Laid-Open Patent Publication No. 2001-154839, a specific user (device) is associated with a storage medium, using an ID number. However, the storage medium once associated with a certain device cannot be used with any other device except for the certain device. That is, in each one of the above-described methods, once a storage medium is associated with an information processing apparatus by making a copy, writing an ID, and the like, the storage medium cannot be used in any other device except for the information processing apparatus with which the storage medium is associated.

SUMMARY OF THE INVENTION

Therefore, an object of the present invention is to provide an information processing system for realizing copy protection by associating a storage medium with an information processing apparatus and also for allowing the storage medium to be used even in other devices.

The present invention has the following features to attain the above-mentioned object. Note that in this section, reference numerals, supplemental descriptions, and the like in parentheses merely indicate correspondence with the below-described embodiment so as to assist understanding of the present invention, and do not limit the present invention in any way.

A first aspect is an information processing system including a program storage medium (100) and an information processing apparatus main body (200) capable of attaching the program storage medium thereto. The program storage medium includes: master program storage means (17a) for storing a program therein; and an ID registration area (17c) for storing therein a main body ID which is an ID unique to the information processing apparatus. The information processing apparatus includes attaching means (201), main body ID storage means (208), copy program storage means (207), copyability determining means (204), copying means (205), main body ID registering means (205), execution program selecting means (210), and executing means (211). The attaching means attaches the program storage medium thereto. The main body ID storage means has the main body ID stored therein. The main body ID may be stored in the main body ID storage means in an embedded manner in advance when the information processing apparatus is manufactured, or may be generated and stored in a random manner when the information processing apparatus has been started up for the first time. The copy program storage means stores therein as a copy program, the program stored in the master program storage means. The copy program storage means may typically be a non-volatile memory. In accordance with an instruction from a user to make a copy, or when the information processing apparatus has been started up and the like, the copyability determining means automatically determines whether or not the main body ID is stored in the ID registration area of the program storage medium attached to the attaching means. The copying means copies the program stored in the master program storage means into the copy program storage means when the copyability determining means determines that the main body ID is not stored. The main body ID registering means reads the main body ID from the main body ID storage means and stores the read main body ID into the ID registration area, in tandem with the copying means making the copy when the copyability determining means determines that the main body ID is not stored. The execution program selecting means selects, from the program copied in the copy program storage means and from the program stored in the master program storage means of the program storage medium attached to the attaching means, a program to be executed. The executing means executes the program selected by the execution program selecting means.

According to the first aspect, it is possible to limit copies unlimitedly made to the information processing apparatus, and it is also possible to selectively start up and execute the program stored in the storage medium from which the program has been copied and the copied program. Further, regardless of the content of the main body ID stored in the ID registration area, it is possible to start up the program stored in and copied from the storage medium, from the storage medium which the program has been copied. That is, it is possible, even in the information processing apparatus into which the program has not been copied, to start up the program from the storage medium, and consequently, it is possible to improve the convenience for the user. Furthermore, it is possible to start up the program from the storage medium, regardless of whether or not the main body ID is stored in the ID registration area, and consequently, it is possible to improve the convenience for the user.

In a second aspect based on the first aspect, the ID registration area allows the main body ID to be stored thereinto only once.

According to the second aspect, it is possible to limit the number of times of making a copy from the storage medium to the information processing apparatus main body, and it is also possible to selectively start up and execute the program stored in the storage medium from which the program has been copied and the copied program.

In a third aspect based on the first aspect, the information processing apparatus further includes ID matching determining means for determining whether or not the main body ID stored in the ID registration area matches the main body ID stored in the main body ID storage means. Further, the copying means copies the program stored in the master program storage means into the copy program storage means when the ID matching determining means determines that the main body IDs match each other.

According to the third aspect, even when a copy has once been made, it is possible to make a copy again if the main body IDs match each other.

In a fourth aspect based on the first aspect, the main body ID registering means reads the main body ID from the main body ID storage means and allows the read main body ID to be stored into the ID registration area, regardless of whether or not the copying means makes the copy (for example, when the user specifies "ID Registration" in FIG. 7 as described below, or when a certain storage medium of which the ID registration area does not have the main body ID registered therein is attached to the information processing apparatus and the information processing apparatus has been turned on and started up, the main body ID of the information processing apparatus may be automatically stored into the ID registration area of the certain storage medium) when the copyability determining means determines that the main body ID is not stored.

According to the fourth aspect, it is possible to only register the main body ID into the storage medium without copying the program. Consequently, it is possible to improve the convenience for the user.

In a fifth aspect based on the first aspect, the program storage medium further includes dedicated data storage means (175). The dedicated data storage means stores thereinto dedicated data which is data used, only when the program copied in the copy program storage means has been started up, for information processing executed by the started up program. The information processing apparatus further includes startup form determining means for determining whether the program has been started up from the program storage medium or from the copy program storage means. The executing means executes the program using the dedicated data only when the startup form determining means determines that the program has been started up from the copy program storage means. Note that the dedicated data may be or may not be copied into the copy program storage means. In the case of copying the dedicated data, the executing means reads the dedicated data from the copy program storage means and uses the read dedicated data (or may read the dedicated data from the storage medium). In the case of not copying the dedicated data, the executing means reads the dedicated data from the storage medium. Further, for example, in the process of an IPL, it is determined whether the program has been started up from the storage medium or from the copy program storage means, and the determination result data is stored. Then, in the process of the program of the storage medium or the program of the copy program storage means, it is determined, in accordance with the determination result data, that the program has been started up from the copy program storage means, and then it is determined whether or not the dedicated data is to be used.

In a sixth aspect based on the first aspect, the program storage medium further includes extension data storage means (176) for storing thereinto extension data which is data used, only when a predetermined condition is satisfied, by the program. The information processing apparatus further includes: startup form determining means for determining whether the program has been started up from the program storage medium or from the copy program storage means; and attachment detecting means for, when the startup form determining means determines that the program has been started up from the copy program storage means, detecting whether or not the program storage medium is attached to the attaching means. The executing means executes the program using the extension data only when the attachment detecting means detects that the program storage medium is attached.

According to the fifth and sixth aspects, it is possible to change the process contents of the program depending on from which unit the program has been started up.

In a seventh aspect based on the first aspect, the information processing apparatus further includes communication means for communicating with another information processing apparatus. The information processing process executes a predetermined process by performing communication via the communication means between the program started up from the program storage medium attached to the information processing apparatus and the program started up from the copy program storage means of said another information processing apparatus.

According to the seventh aspect, it is possible, with one storage medium, to execute certain information processing while performing communication between the two information processing apparatuses.

An eighth aspect is an information processing apparatus capable of attaching thereto a program storage medium including an ID registration area for storing therein a main body ID which is an ID unique to the information processing apparatus and also including a master program storage area having a program stored therein. The information processing apparatus includes attaching means (201), main body ID storage means (208), copy program storage means (207), copyability determining means (204), copying means (205), main body ID registering means (205), execution program selecting means (210), and executing means (211). The attaching means attaches the program storage medium thereto. The main body ID storage means has the main body ID stored therein. The copy program storage means stores therein as a copy program, the program stored in the master program storage area. The copyability determining means determines whether or not the main body ID is stored in the ID registration area of the program storage medium attached to the attaching means. The copying means copies the program stored in the master program storage area into the copy program storage means when the copyability determining means determines that the main body ID is not stored. The main body ID registering means reads the main body ID from the main body ID storage means and stores the read main body ID into the ID registration area, in tandem with the copying means making the copy when the copyability determining means determines that the main body ID is not stored. The execution program selecting means selects, from the program copied in the copy program storage means and from the program stored in the master program storage area of the storage medium attached to the attaching means, a program to be executed. The executing means executes the program selected by the execution program selecting means.

According to the eighth aspect, it is possible to obtain an effect similar to that of the first aspect.

A ninth aspect is a computer-readable storage medium having stored therein an information processing program to be executed by a computer of an information processing apparatus capable of attaching thereto a program storage medium including an ID registration area for storing therein a main body ID which is an ID unique to the information processing apparatus and also including a master program storage area having a program stored therein. The computer-readable storage medium causes the computer to function as copyability determining means, copying means, main body ID registering means, execution program selecting means, and executing means. The copyability determining means determines whether or not the main body ID is stored in the ID registration area of the attached program storage medium. The copying means copies the program stored in the master program storage area into storage means incorporated in the information processing apparatus when the copyability determining means determines that the main body ID is not stored. The main body ID registering means stores the main body ID of the information processing apparatus into the ID registration area, in tandem with the copying means making the copy when the copyability determining means determines that the main body ID is not stored. The execution program selecting means selects, from the program copied in the storage means incorporated in the information processing apparatus and from the program stored in the master program storage area of the attached program storage medium, a program to be executed. The executing means executes the program selected by the execution program selecting means.

According to the ninth aspect, it is possible to obtain an effect similar to that of the first aspect.

A tenth aspect is a computer-readable storage medium having stored therein an information processing program to be executed by a computer of an information processing apparatus capable of attaching thereto a program storage medium having a program stored therein and of copying the program thereinto. The computer-readable storage medium causes the computer to function as startup form determining means and executing means. The startup form determining means determines whether the program has been started up from the program storage medium or the copied program has been started up. The executing means executes a process which varies depending on the determination result of the startup form determining means.

According to the tenth aspect, it is possible to obtain an effect similar to that of the fifth aspect.

According to the present invention, it is possible to limit copies unlimitedly made to the information processing apparatus, and it is also possible to selectively start up and execute the program stored in the storage medium from which the program has been copied and the copied program. Consequently, it is possible to improve the convenience for the user.

These and other objects, features, aspects and advantages of the present invention will become more apparent from the following detailed description of the present invention when taken in tandem with the accompanying drawings.

BRIEF DESCRIPTION OF THE DRAWINGS

FIG. 1 is a schematic diagram showing a system of an embodiment of the present invention;

FIG. 4 is a perspective view of the hand-held game apparatus 10 according to the embodiment of the present invention;

FIG. 19 is a flowchart showing an ID registration process of step S68 of FIG. 18 in detail;

DESCRIPTION OF THE PREFERRED EMBODIMENTS

With reference to the drawings, an embodiment of the present invention will be described below. Note that this embodiment does not limit the scope of the present invention in any way.

FIG. 1 is a schematic diagram showing a system of an embodiment of the present invention. Referring to FIG. 1, it is possible to attach to an information processing apparatus 200 having a non-volatile memory and a connector, anyone (hereinafter referred to as a "storage medium 100") of storage media 100a, 100b, and 100c, each having a game program (hereinafter referred to as a "game PG") stored therein, for example. Then, it is possible to read the game PG from the attached storage medium 100 and execute the read game PG. Further, it is possible to copy the game PG of the storage medium 100 into the non-volatile memory of the information processing apparatus 200. Furthermore, it is possible to copy a plurality of the game PGs into the non-volatile memory. That is, it is possible to separately attach to the information processing apparatus 200, the storage media 100a, 100b, and 100c which have the game PGs different from each other, and it is possible to separately copy the game PGs from the storage media 100a, 100b, and 100c into the non-volatile memory. In this case, a process is performed on the storage medium 100 such that once a copy has been made from the storage medium 100, another copy cannot be made therefrom to another information processing apparatus 200. Thus, even when the storage medium 100 is not attached, it is possible to start up the game PG copied as described above from the non-volatile memory. Further, even when the storage medium 100 (i.e., the storage medium 100 on which the process is performed such that another copy cannot be made therefrom to another information processing apparatus 200) from which the above-described copy has been made is attached, it is also possible to directly start up the game PG stored in the storage medium 100, not to start up the game PG from the non-volatile memory.

Figure 2:
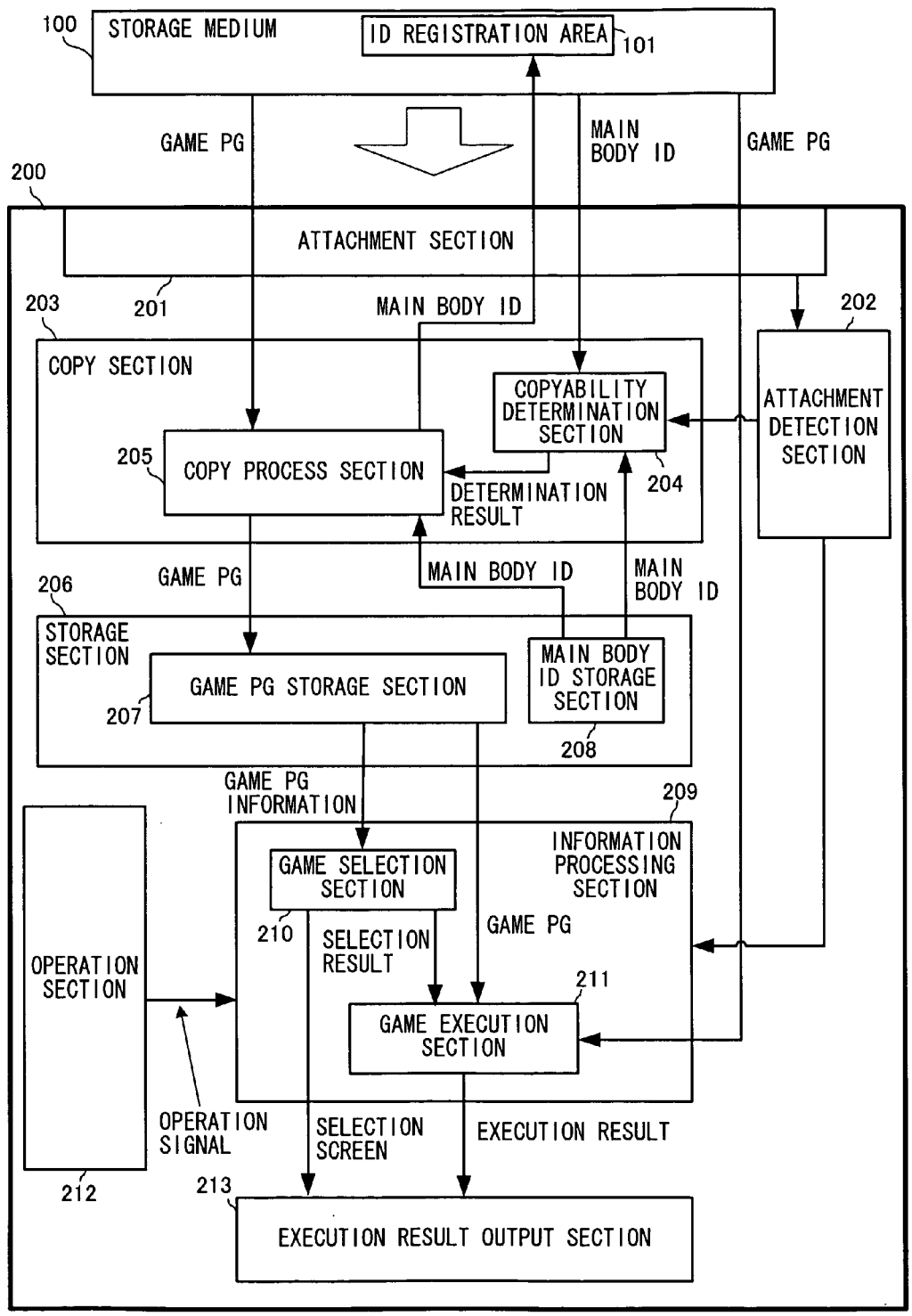
FIG. 2 is a functional block diagram showing a storage medium and an information processing apparatus, both according to the embodiment of the present invention.

FIG. 2 is a functional block diagram showing the storage medium 100 and the information processing apparatus 200, both according to the embodiment of the present invention. The storage medium 100 is a medium having the game PG stored therein. Further, the storage medium 100 includes an ID registration area 101. The ID registration area 101 is an area into which data can be written only once. The ID registration area 101 may include, for example, a fuse-type one-time ROM. In the initial state (in the default settings), nothing is yet written in the ID registration area 101. Then, when the game PG is copied, a main body ID of the information processing apparatus 200 into which the game PG is to be copied is written into the ID registration area 101.

The information processing apparatus 200 includes an attachment section 201, an attachment detection section 202, a copy section 203, a storage section 206, an information processing section 209, an operation section 212, and an execution result output section 213. The attachment section 201 is a connector or a slot, each for attaching the storage medium 100 thereto. The attachment detection section 202 detects that the storage medium 100 is attached to the attachment section 201. Further, the attachment detection section 202 outputs, to a copyability determination section 204 and the information processing section 209, a signal indicating that the storage medium 100 is attached.

The copy section 203 has a function of making a copy from the storage medium 100 to the information processing apparatus 200. The copy section 203 includes the copyability determination section 204 and a copy process section 205. The copyability determination section 204 accesses the ID registration area 101 and determines whether or not it is possible to make a copy from the attached storage medium 100. The copy process section 205 has a function of copying the game PG from the attached storage medium 100 into the information processing apparatus 200 based on the determination result of the copyability determination section 204.

The storage section 206 includes a game PG storage section 207 and a main body ID storage section 208. The game PG storage section 207 is an area for storing therein the game PG copied by the copy process section 205. The game PG storage section 207 includes a readable/writable non-volatile memory. For example, the game PG storage section 207 may include a flash memory.

The main body ID storage section 208 has stored therein the main body ID which is an ID unique to the main body of the information processing apparatus 200. The main body ID storage section 208 may include, for example, a read-only memory, i.e., a ROM.

The information processing section 209 includes a game selection section 210 and a game execution section 211. The game selection section 210 acquires information regarding the copied game PG and the game PG stored in the storage medium 100 attached to the attachment section 201, and displays a game selection screen on a screen through the execution result output section 213. Then, based on an operation signal and the like inputted by a user through the operation section 212, the game selection section 210 selects, from the game PG stored in the attached storage medium 100 and from the game PGs (the copied game PGs) stored in the game PG storage section 207, a game PG to be started up. Then, the game selection section 210 outputs the selection result to the game execution section 211.

The game execution section 211 reads, from the storage medium 100 or the game PG storage section 207, the game PG selected by the game selection section 210 and executes the read game PG. Then, the game execution section 211 outputs the execution result (a game screen, a sound, etc.) to the execution result output section 213. The operation section 212 has a function for the user to give a game selection instruction and to perform an operation on the game PG executed by the game execution section 211. The execution result output section 213 has a function for outputting the execution result of the game execution section 211 to a predetermined screen, a loudspeaker, and the like.

Next, an overview of the operation of the system of the present embodiment having the above-described structure will be described. First, the storage medium 100 is attached to the attachment section 201. In response, the attachment detection section 202 detects that the storage medium 100 is attached, and outputs, to the copyability determination section 204, a signal indicating that the storage medium 100 is attached. When having received the signal, the copyability determination section 204 determines whether or not the game PG stored in the storage medium 100 is copyable. Specifically, the copyability determination section 204 accesses the ID registration area 101 and determines whether or not the accessed ID registration area 101 is writable. That is, when the ID registration area 101 is unwritable, the copyability determination section 204 determines that a certain main body ID is registered therein, i.e., that a copy has already been made from the storage medium 100. When the ID registration area 101 is writable, the copyability determination section 204 determines that nothing is yet written therein, i.e., that a copy has not yet been made from the storage medium 100. Then, when the ID registration area 101 is unwritable, the copyability determination section 204 outputs, to the copy process section 205, the determination result that the game PG is uncopyable. On the other hand, when the ID registration area 101 is writable, the copyability determination section 204 outputs, to the copy process section 205, the determination result that the game PG is copyable.

When the determination result from the copyability determination section 204 indicates that the game PG is copyable, the copy process section 205 performs the process of copying the game PG stored in the storage medium 100. Specifically, the copy process section 205 reads the game PG from the storage medium 100 and copies the read game PG into the game PG storage section 207. Further, the copy process section 205 reads the main body ID from the main body ID storage section 208 and copies the read main body ID into the ID registration area 101. The ID registration area 101, which includes a one-time ROM as described above, becomes unwritable after the main body ID is written thereinto by this copy process. Consequently, once a copy has been made from the storage medium 100, it is impossible to execute the copy process using the storage medium 100 thereafter.

The information processing section 209 starts up the game PG and executes a predetermined game process. When the storage medium 100 is not attached, the information processing section 209 selects a predetermined game PG from the game PGs copied as described above and stored in the game PG storage section 207. On the other hand, when the storage medium 100 is attached, the information processing section 209 selects a predetermined game PG from the game PGs stored in the game PG storage section 207 and from the game PG stored in the attached storage medium 100.

The information processing section 209 includes the game selection section 210 and the game execution section 211. When not receiving from the attachment detection section 202, the signal indicating that the storage medium 100 is attached, the game selection section 210 acquires information regarding the game PGs from the game PG storage section 207, generates a selection list, and displays the generated selection list on the screen. On the other hand, when receiving from the attachment detection section 202, the signal indicating that the storage medium 100 is attached, the game selection section 210 reads the information regarding the game PG from the storage medium 100, as well as the information regarding the game PGs stored in the game PG storage section 207, generates a selection list, and displays the generated selection list on the screen. The user selects, from the selection list and through the operation section 212, a game PG to be started up. The selection result is outputted to the game execution section 211. The game execution section 211 reads the game PG from the game PG storage section 207 or the storage medium 100 based on the selection result, extends the read game PG into memory not shown in the figures, and executes the extended game PG.

As described above, based on the system of the present embodiment, it is possible to limit the number of times of making a copy from a storage medium to an information processing apparatus main body, and it is also possible to selectively start up and execute the game PG stored in the storage medium from which the game PG has been copied and the game PG copied in the information processing apparatus main body.

Figure 3:
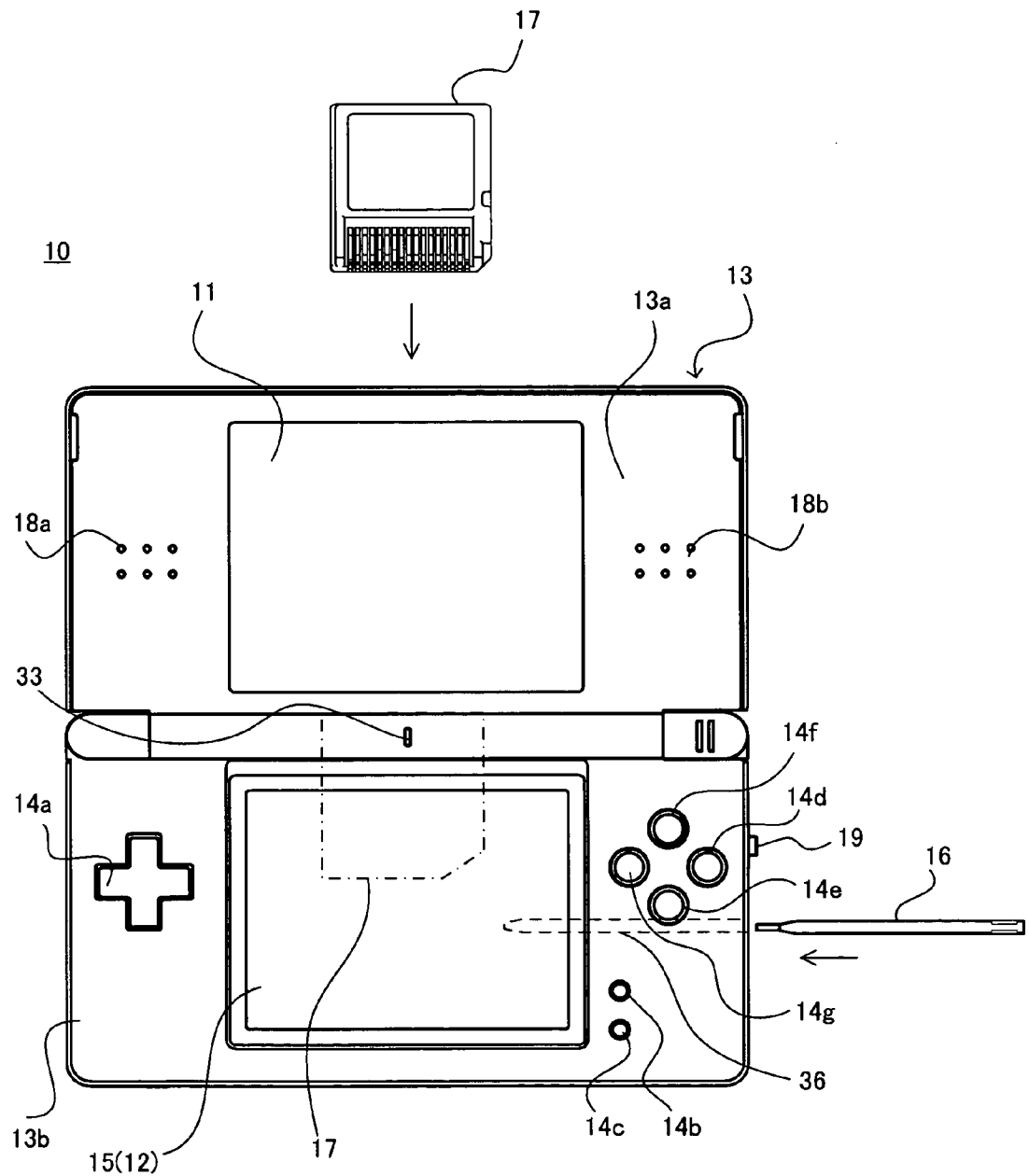
FIG. 3 is an external view of a hand-held game apparatus 10 according to the embodiment of the present invention.

Next, a specific example of the process of the present invention will be described, taking a hand-held game apparatus 10 as an example of the information processing apparatus 200. FIG. 3 is an external view of the hand-held game apparatus 10. FIG. 4 is a perspective view of the hand-held game apparatus 10. Referring to FIG. 3, the hand-held game apparatus 10 includes a first LCD (Liquid Crystal Display) 11 and a second LCD 12. A housing 13 is composed of an upper housing 13a and a lower housing 13b. The first LCD 11 is accommodated in the upper housing 13a and the second LCD 12 is accommodated in the lower housing 13b. The first LCD 11 and the second LCD 12 each have a resolution of 256 dots×192 dots. Note that although an LCD is used as a display device in the present embodiment, any other arbitrary display devices such as a display device employing EL (Electro Luminescence) may be used. Further, the display device can have any arbitrary resolution.

On the upper housing 13a, sound holes 18a and 18b are formed to release a sound from a pair of loudspeakers (30a and 30b shown in FIG. 5) as described below to the outside of the hand-held game apparatus 10.

On a hinge section connecting the upper housing 13a and the lower housing 13b in a foldable manner, a microphone hole 33 is provided.

On the lower housing 13b, a cross switch 14a, a start switch 14b, a select switch 14c, an A-button 14d, a B-button 14e, an X-button 14f, and a Y-button 14g are provided as input devices. Further, on the screen of the second LCD 12, a touch panel 15 is mounted as an additional input device. In the lower housing 13b, a power switch 19, an opening for accommodating a memory card 17, and an opening for accommodating a stick 16 are provided.

The touch panel 15 is a resistance film type touch panel. Note, however, that in the present invention, not only the resistance film type touch panel but also any arbitrary pressure type touch panel may be used. It is possible to operate the touch panel 15 not only by the stick 16 but also by a finger. In the present embodiment, the touch panel 15 has the same resolution (detection accuracy) as that of the second LCD 12, i.e., 256 dots×192 dots. Note, however, that the touch panel 15 and the second LCD 12 do not necessarily have the same resolution.

The memory card 17 is a specific example of the storage medium 100. The memory card 17 is a storage medium having a game PG stored therein, and is detachably attached to the opening provided in the lower housing 13b. Further, the memory card 17 includes the above-described one-time ROM.

Next, with reference to FIG. 5, the internal structure of the hand-held game apparatus 10 will be described.

Figure 5:
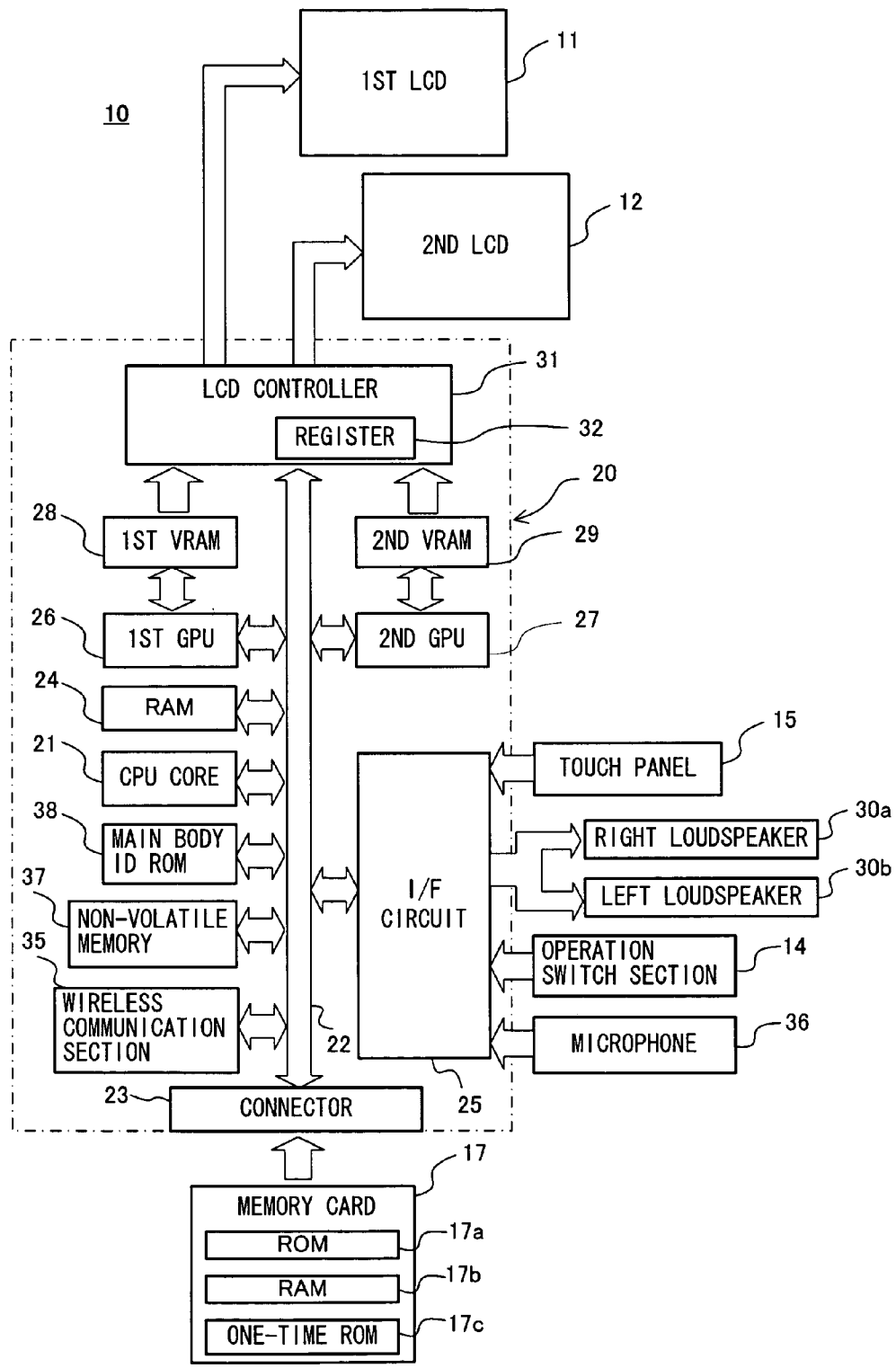
FIG. 5 is a block diagram showing the hand-held game apparatus 10 according to the embodiment of the present invention.

Referring to FIG. 5, an electronic circuit board 20 accommodated in the housing 13 has a CPU core 21 (corresponding to the attachment detection section 202, the copy section 203, and the information processing section 209 of FIG. 2) mounted therein. The CPU core 21 is connected via a bus 22 to a connector 23, an input/output interface circuit (denoted as "I/F circuit" in FIG. 5) 25, a first GPU (Graphics Processing Unit) 26, a second GPU 27, a RAM 24, an LCD controller 31, and a wireless communication section 35. The memory card 17 is detachably connected to the connector 23. The memory card 17 has mounted therein a ROM 17a for storing the game PG therein, a RAM 17b for rewritably storing backup data therein, and a one-time ROM 17c as described above. When a startup of the game PG from the memory card 17 has been selected by the user, the game PG stored in the ROM 17a of the memory card 17 is loaded into the RAM 24 and the game PG loaded in the RAM 24 is executed by the CPU core 21. Further, the main body ID is written into the one-time ROM 17c while the above-described copy process is executed.

The RAM 24 stores therein, as well as the game PG, temporary data obtained when the CPU core 21 executes the game PG and data for generating a game image. The input/output interface circuit 25 is connected to the touch panel 15, the right loudspeaker 30a, the left loudspeaker 30b, an operation switch section 14 including the cross switch 14a, the A-button 14d and the like of FIG. 3, and a microphone 36. The right loudspeaker 30a and the left loudspeaker 30b are positioned inside the sound holes 18a and 18b, respectively. The microphone 36 is positioned inside the microphone hole 33.

The first GPU 26 is connected to a first VRAM (Video RAM) 28 and the second GPU 27 is connected to a second VRAM 29. In response to an instruction from the CPU core 21, the first GPU 26 generates a first game image based on the data for generating a game image which is stored in the RAM 24, and draws the generated first game image into the first VRAM 28. Similarly, in response to an instruction from the CPU core 21, the second GPU 27 generates a second game image and draws the generated second game image into the second VRAM 29. The first VRAM 28 and the second VRAM 29 are connected to the LCD controller 31.

The LCD controller 31 includes a register 32. The register 32 stores the value of 0 or 1 thereinto in response to an instruction from the CPU core 21. When the value of the register 32 is 0, the LCD controller 31 outputs the first game image drawn in the first VRAM 28 to the first LCD 11 and also outputs the second game image drawn in the second VRAM 29 to the second LCD 12. When the value of the register 32 is 1, the LCD controller 31 outputs the first game image drawn in the first VRAM 28 to the second LCD 12 and also outputs the second game image drawn in the second VRAM 29 to the first LCD 11.

The wireless communication section 35 has a function of exchanging, among the wireless communication section 35 and wireless communication sections of other game apparatuses, data used for a game process and other data.

A non-volatile memory 37 is a storage medium (corresponding to the game PG storage section 207) for storing therein the copied game PG and may include, for example, a flash memory. Then, when a startup of the copied game PG has been selected by the user, the game PG stored in the non-volatile memory 37 is loaded into the RAM 24 and the game PG loaded in the RAM 24 is executed by the CPU core 21.

A main body ID ROM 38 is a ROM having stored therein the main body ID which is a unique ID as described above, and corresponds to the main body ID storage section 208 of FIG. 2. That is, the hand-held game apparatus 10 is shipped after the main body ID is set in advance when the hand-held game apparatus 10 is manufactured.

Note that the present invention can be applied not only to a game apparatus but also to any arbitrary device having a pressure type touch panel supported by a housing. For example, the present invention can be applied to a controller of a stationary game apparatus and to a PDA (Personal Digital Assistant). Alternatively, the present invention can also be applied to an input device which does not have a display provided under the touch panel.

Next, the operation of the hand-held game apparatus 10 having the above-described structure will be described below. In the present embodiment, the description will be given, taking as an example the case of performing the following process. First, it is assumed that there exist two memory cards 17 of a game A and a game B. A copy has not yet been made from the memory card 17 of the game A (e.g., immediately after purchase). On the other hand, a copy has already been made from the memory card 17 of the game B to the hand-held game apparatus 10. Here, the owner of the hand-held game apparatus 10 in which the game B is copied is different from the owner of the below-described hand-held game apparatus 10. That is, it is assumed that a copy has already been made from the memory card 17 of the game B to the hand-held game apparatus 10 of the different owner, and the owner of the below-described hand-held game apparatus 10 is borrowing the memory card 17 of the game B.

First, the operation performed when, of the above-described two memory cards 17, the memory card 17 of the game A is attached will be described. When the memory card 17 of the game A is attached, the CPU core 21 accesses the one-time ROM 17c and determines whether or not the accessed one-time ROM 17c is writable. Since the game A has not yet been copied, the one-time ROM 17c is writable. That is, it is determined that it is possible to copy the game A into the hand-held game apparatus 10. Then, a message for confirming whether or not a copy is allowed to be made is displayed on the screen. When, in response to the message, the user inputs an answer that a copy is to be made, the CPU core 21 executes the copy process (an automatic execution of the copy process). That is, the CPU core 21 reads the game PG from the ROM 17a of the memory card 17 and stores the read game PG into the non-volatile memory 37. Further, the CPU core 21 reads the main body ID from the main body ID ROM 38 and writes the read main body ID into the one-time ROM 17c. Consequently, the one-time ROM 17c is unwritable thereafter.

Figure 6:
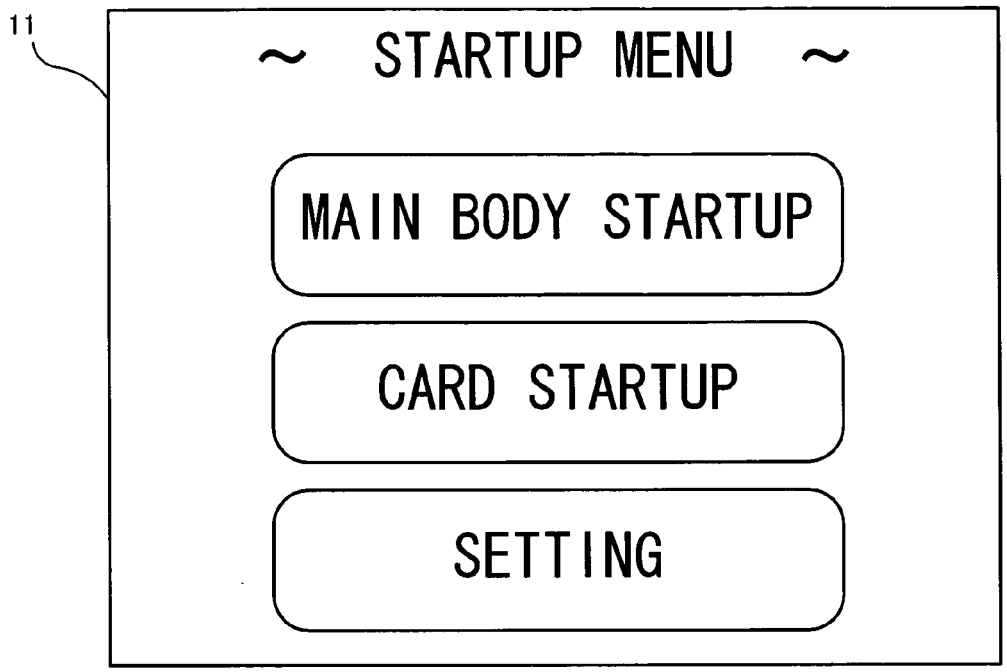
FIG. 6 shows an example of a screen of a game assumed in the present embodiment.
Figure 7:
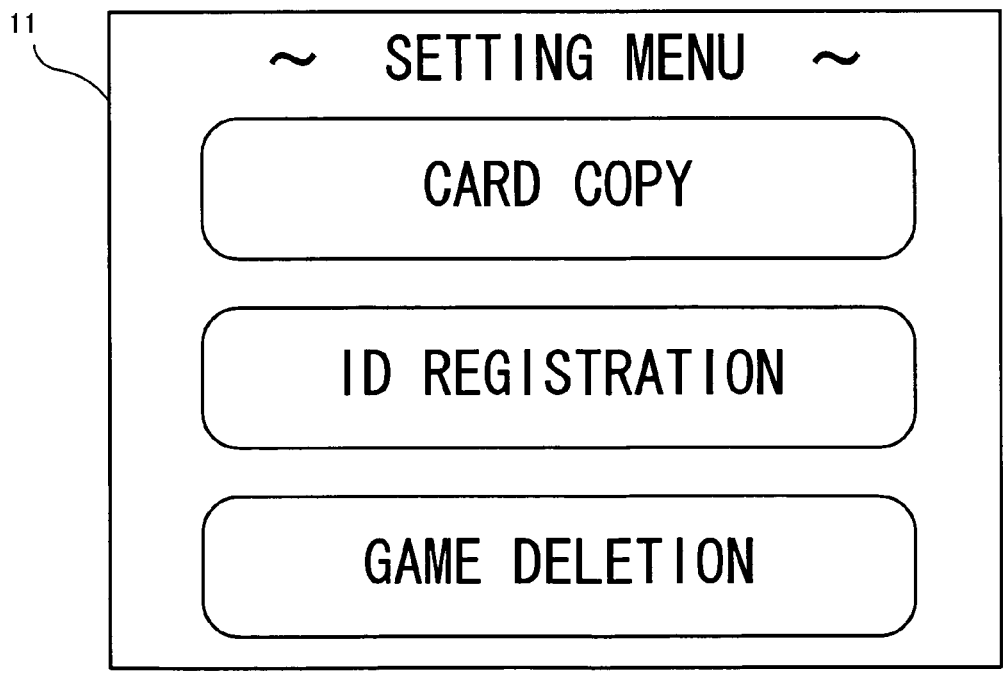
FIG. 7 shows an example of the screen of the game assumed in the present embodiment.

After the copy process is completed, "Startup Menu" is displayed. In "Startup Menu", three main items are displayed. FIG. 6 shows an example of "Startup Menu". In "Startup Menu" shown in FIG. 6, the first item is "Main Body Startup" for reading the game PG copied in the non-volatile memory 37 and starting up the read game PG. The second item is "Card Startup" for starting up the game PG from the currently attached memory card 17, i.e., the memory card 17 of the game A. The third item is "Setting". When "Setting" is selected, the screen switches to "Setting Menu" shown in FIG. 7. In "Setting Menu", three items including "Card Copy", "ID Registration", and "Game Deletion" are displayed.

"Card Copy" is an item for manually copying or recopying the game PG. That is, in the present embodiment, as described above, when the memory card 17 from which a copy has not yet been made is attached, the copy process is automatically executed. It is assumed that the user inputs, in response to the confirmation message displayed at this time, an answer that a copy is not to be made, and thereafter, the user wishes to make a copy. In this case, it is possible, through "Card Copy" included in "Setting Menu", to copy the game PG by the user's explicit instruction. Further, even when the game A is, after being copied once, deleted from the non-volatile memory 37 through "Game Deletion" as described below, it is possible to copy (i.e., recopy) the game A again through "Card Copy". That is, if the hand-held game apparatus 10 into which a recopy is to be made is the same as the hand-held game apparatus 10 into which the game A has once been copied (i.e., in the case where the main body ID of the game apparatus 10 side matches the main body ID of the memory card 17 side), it is possible to make the recopy.

"ID Registration" is an item for only writing the main body ID into the one-time ROM 17c without copying the game PG.

For example, when the available space of the non-volatile memory 37 is insufficient, only the main body ID is written into the memory card 17 in advance through "ID Registration". Then, at a later date, unnecessary game PGs such as those of completed games are deleted through "Game Deletion" as described below so as to make sufficient available space. Then, it is possible, through "Card Copy" as described above, to copy the game PG from the memory card 17 in which only the main body ID is written in advance.

"Game Deletion" is an item for deleting the game PGs stored in the non-volatile memory 37 so as to, for example, make sufficient available space.

When the user specifies "Main Body Startup" in "Startup Menu" of FIG. 6, the game A is started up from the non-volatile memory 37. On the other hand, when the user specifies "Card Startup", the game A is started up from the memory card 17. That is, in this case, it is possible to start up the game A from both the memory card 17 and the non-volatile memory 37.

Next, the operation performed when the memory card 17 of the game B is attached will be described. When the memory card 17 of the game B is attached, the CPU core 21 accesses the one-time ROM 17c and determines whether or not the accessed one-time ROM 17c is writable. Since the game B has already been copied into the hand-held game apparatus 10 of the different owner, the one-time ROM 17c is unwritable. In this case, it is determined that the game B is uncopyable. Therefore, the above-described copy process is not executed, and "Startup Menu" is displayed. At this time, if the game A has already been copied as described above, it is possible to start up the game A through "Main Body Startup". On the other hand, when the user selects "Card Startup", the game B is started up. That is, although it is impossible to copy, into the hand-held game apparatus 10 of the owner, the game PG of the memory card 17 which has already been copied into the hand-held game apparatus 10 of the different owner, it is possible to start up the game PG from the memory card 17.

As described above, in the present embodiment, it is possible to copy, into any one of the hand-held game apparatuses 10 only once, the game PG which has not yet been copied, e.g., immediately after purchase. Further, it is possible to start up, in any one of the hand-held game apparatuses 10, the game PG which has once been copied, only if starting up the game PG directly from the memory card 17. Consequently, it is possible to play in the following manner, for example. First, a player A purchases one memory card 17 and makes a copy from the purchased memory card 17 to the hand-held game apparatus 10 of the player A. Then, the player A lends a player B the memory card 17 from which the copy has already been made. Then, the player A starts up the game PG from the non-volatile memory 37 and the player B starts up the game PG from the memory card 17. As a result, it is possible to play a versus game using the same game PG between the players A and B. Further, since the number of times of making a copy is limited to one time only, it is possible to prevent copies from being unlimitedly made to the hand-held game apparatuses 10 of the different owners, and thus it is also possible to prevent market opportunities from being lost.

Next, the process performed in the system of the present embodiment will be described in detail. First, with reference to FIGS. 8 through 11, main data used in the process will be described.

Figure 8:
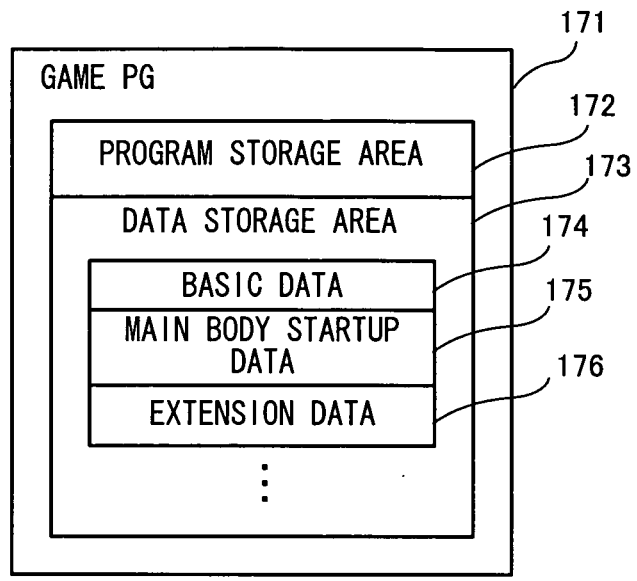
FIG. 8 is a memory map illustrating a memory space of a ROM 17a of FIG. 5.

FIG. 8 is a diagram showing main data stored in the ROM 17a of the memory card 17. Referring to FIG. 8, the ROM 17a of the memory card 17 has stored therein a game PG 171 including a program storage area 172 and a data storage area 173.

The program storage area 172 has stored therein various programs used to execute the game process. The data storage area 173 has stored therein various data used to execute the game process. The various data includes basic data 174, main body startup data 175, extension data 176, and the like. The basic data 174 is data constantly used in the game process. The main body startup data 175 is data used in the game process only when the game PG has been started up through "Main Body Startup", i.e., started up from the non-volatile memory 37. That is, the main body startup data 175 is data not used in the game process when the game PG has been started up through "Card Startup". The extension data 176 is data used in the game process only when a predetermined condition is satisfied. In the present embodiment, as the predetermined condition, it is assumed that when the same game PG can be started up from both the memory card 17 and the non-volatile memory 37 (i.e., in the state where the memory card 17 from which the game PG has been copied is attached), the game PG is started up through "Main Body Startup".

Figure 9:
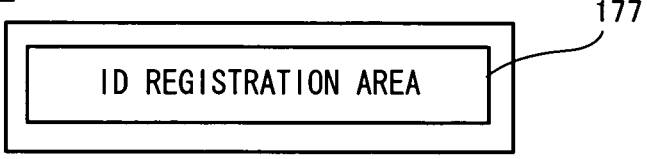
FIG. 9 is a memory map illustrating a memory space of a one-time ROM 17c of FIG. 5.

FIG. 9 is a diagram showing data stored in the one-time ROM 17c of the memory card 17. The one-time ROM 17c includes an ID registration area 177 into which data can be written only once. The ID registration area 177 stores the main body ID therein.

Figure 10:
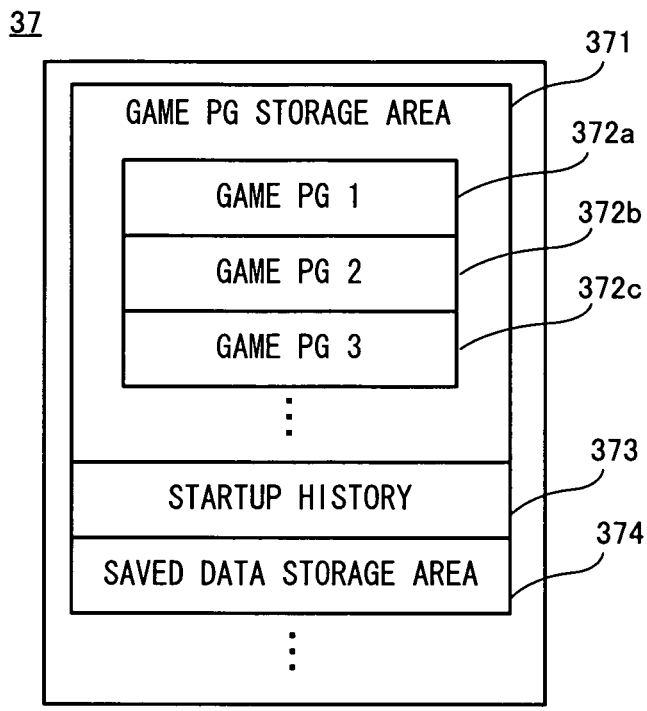
FIG. 10 is a memory map illustrating a memory space of a non-volatile memory 37 of FIG. 5.

FIG. 10 is a diagram showing main data stored in the non-volatile memory 37 of the hand-held game apparatus 10. Referring to FIG. 10, the non-volatile memory 37 includes a game PG storage area 371, startup history 373, and saved data storage area 374. The game PG storage area 371 is an area for storing therein, as a game PG 372, the game PG 171 copied from the memory card 17, and is capable of storing a plurality of the game PGs 171 therein as game PGs 372a, 372b, 372c.... The structure of the game PG 372 is the same as that of the game PG 171 of the memory card 17, and therefore will not be described. The startup history 373 is an area for storing therein the history of the startups of the game PGs stored in the game PG storage area 371, such as when which one of the game PGs has been started up. The saved data storage area 374 is an area for storing therein saved data generated in each game process.

Figure 11:
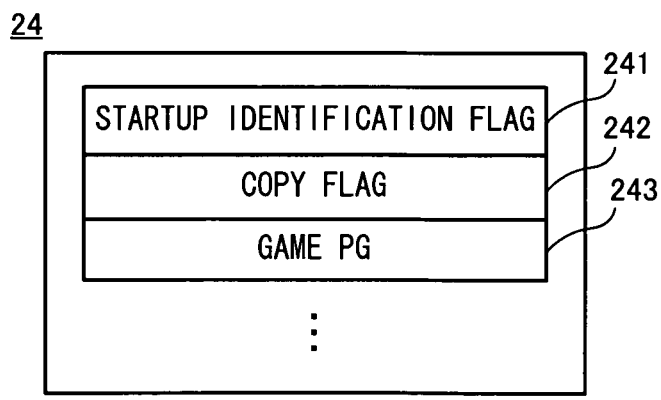
FIG. 11 is a memory map illustrating a memory space of a RAM 24 of FIG. 5.

FIG. 11 is a diagram showing main data stored in the RAM 24 of the hand-held game apparatus 10. The RAM 24 includes a startup identification flag 241, a copy flag 242, and a game PG 243. The startup identification flag 241 is a flag indicating whether the game PG currently being executed has been started up through "Main Body Startup" or "Card Startup". In the present embodiment, the startup identification flag 241 is set to the value of "Main Body" in the case of "Main Body Startup", and is set to the value of "Card" in the case of "Card Startup". The copy flag 242 is a flag indicating whether or not it is possible to make a copy from the attached memory card 17. In the present embodiment, the copy flag 242 is set to the value of "OK" or "NG". The game PG 243 is the game PG which is the game PG 372 stored in the non-volatile memory 37 or the game PG 171 stored in the memory card 17 and which is thereafter copied into the RAM 24 in the game process.

Figure 12:
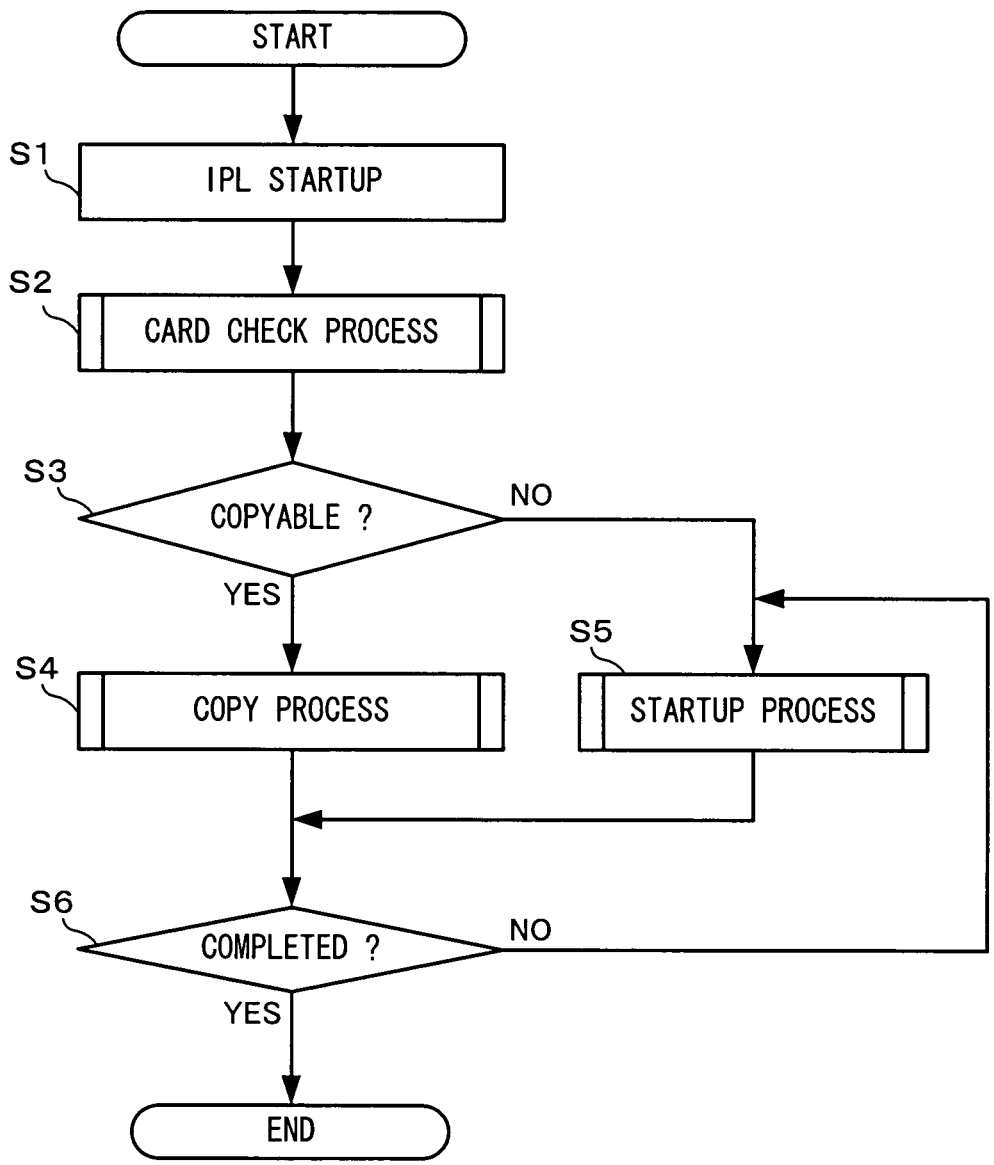
FIG. 12 is a flow chart showing the process of the embodiment of the present invention.

Next, with reference to FIGS. 12 through 21, the flow of the process performed in the hand-held game apparatus 10 will be described. FIG. 12 is a flow chart showing the flow of the process performed in the hand-held game apparatus 10. When the hand-held game apparatus 10 is turned on, the CPU core 21 of the hand-held game apparatus 10 starts up an IPL (step S1). That is, the CPU core 21 executes a startup program stored in a boot ROM not shown in the figures and initializes each unit such as the RAM 24.

Figure 13:
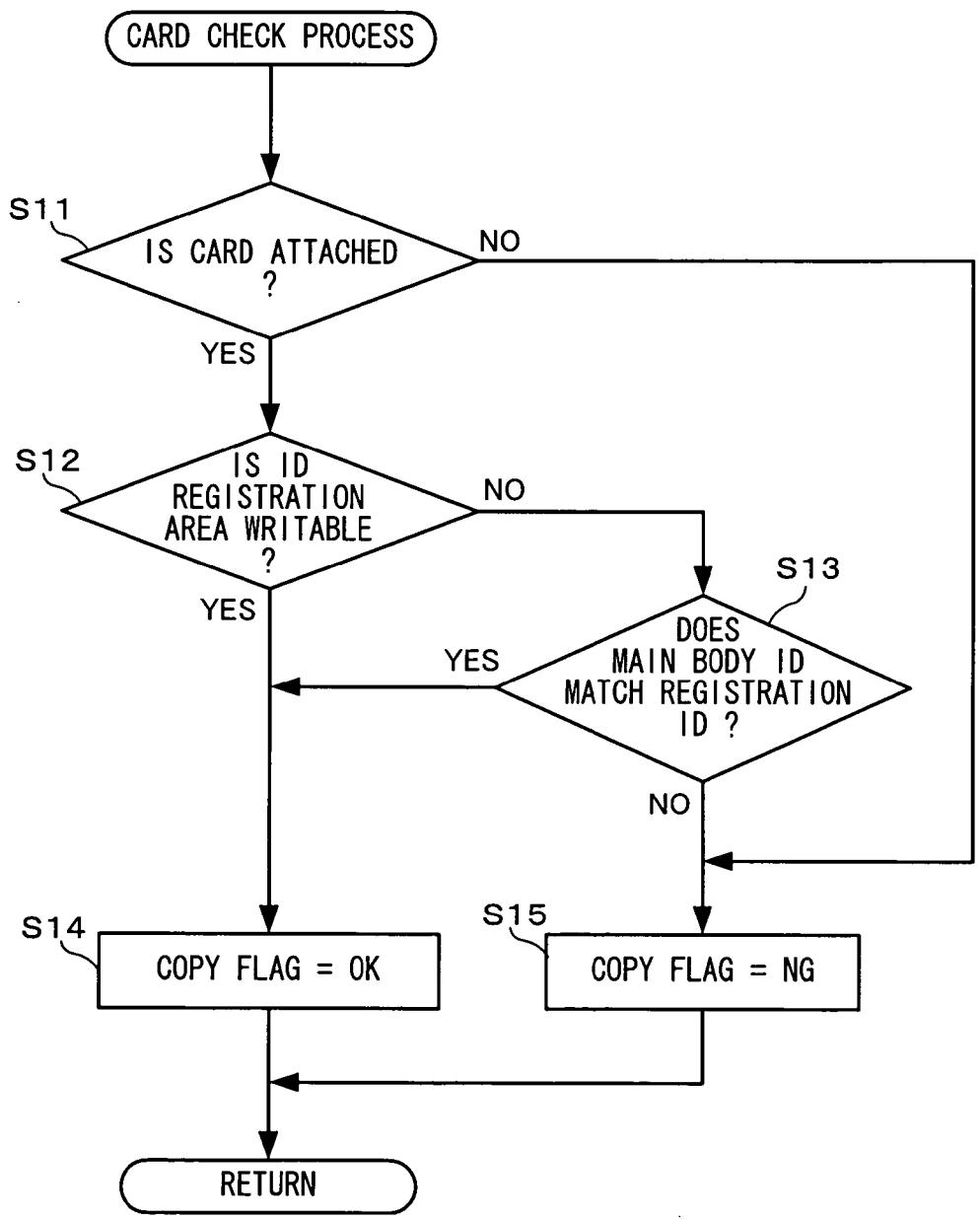
FIG. 13 is a flow chart showing a card check process of step S2 of FIG. 12 in detail.

Next, the CPU core 21 executes a card check process for checking whether or not it is possible to make a copy from the memory card 17 (step S2). FIG. 13 is a flow chart showing the card check process of step S2 in detail. Referring to FIG. 13, first, the CPU core 21 determines whether or not the memory card 17 is attached to the connector 23 (step S11). When the memory card 17 is not attached ("No" in step S1), the CPU core 21 sets the copy flag 242 to "NG" (step S15) and ends the card check process. On the other hand, when the memory card 17 is attached ("Yes" in step S11), subsequently, the CPU core 21 accesses the ID registration area 177 and determines whether or not the accessed ID registration area 177 is writable (step S12). As a result of the determination, when the ID registration area 177 is writable ("Yes" in step S12), the CPU core 21 sets the copy flag 242 to "OK" (step S14). On the other hand, when the ID registration area 177 is unwritable ("No" in step S12), the CPU core 21 reads the main body ID (hereinafter referred to as a "registration ID") registered in the ID registration area 177 of the memory card 17 and determines whether or not the read registration ID matches the main body ID stored in the main body ID ROM 38 (step S13). As a result, when the registration ID matches the stored main body ID, the copy flag 242 is set to "OK" in step S14. When the registration ID does not match the stored main body ID, the copy flag 242 is set to "NG" in step S15. That is, the copy flag 242 is set to "OK", only when the registration ID is not registered in the memory card 17, or only when the registration ID is registered in the memory card 17 but matches the main body ID of the hand-held game apparatus 10 to which the memory card 17 is attached. The card check process is completed as described above.

Referring back to FIG. 12, when the card check process is completed, next, the CPU core 21 determines based on the copy flag 242 whether or not it is possible to make a copy from the attached memory card 17 (step S3). Specifically, when the copy flag 242 is set to "OK", the CPU core 21 determines that it is possible to make a copy from the attached memory card 17. When the copy flag 242 is set to "NG", the CPU core 21 determines that it is impossible to make a copy from the attached memory card 17.

Figure 14:
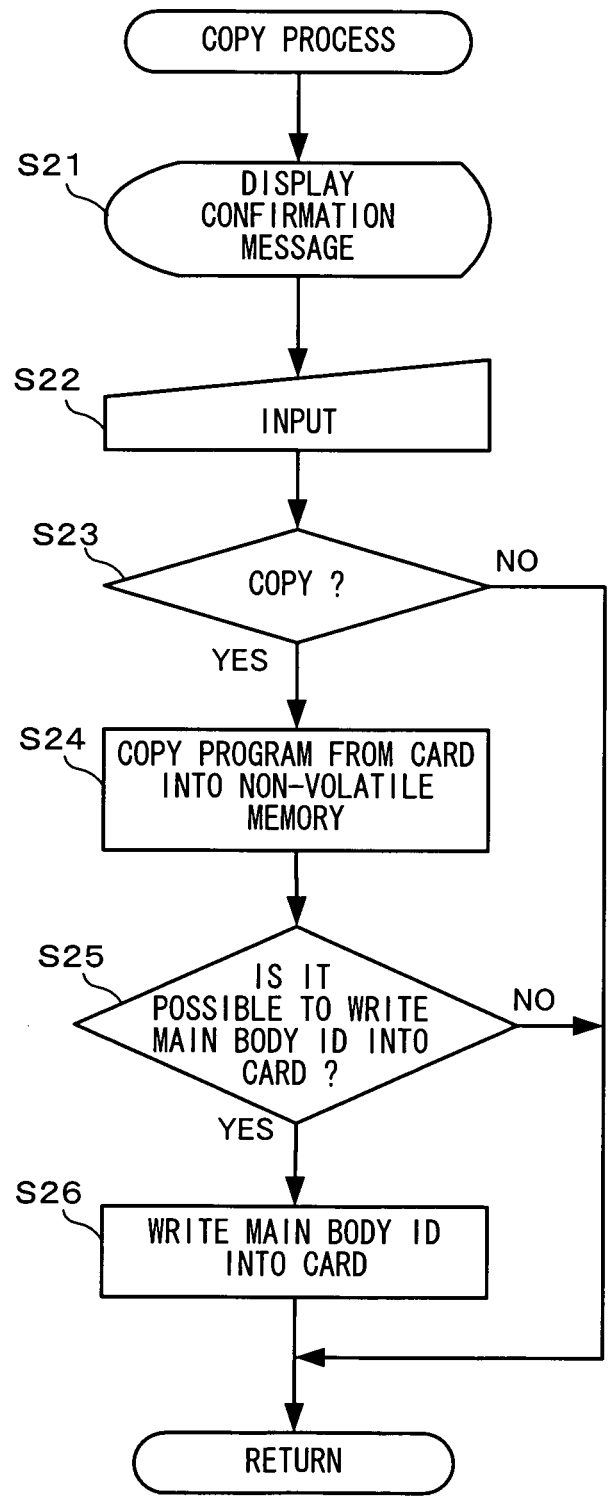
FIG. 14 is a flow chart showing a copy process of step S4 of FIG. 12 in detail.

As a result of the determination, when it is possible to make a copy from the attached memory card 17, the CPU core 21 executes the copy process (step S4). That is, since the memory card 17 from which a copy has not yet been made is attached, the copy process is automatically executed in this case. FIG. 14 is a flow chart showing the copy process of step S4 in detail. Referring to FIG. 14, first, the CPU core 21 generates a confirmation message for making an inquiry to the user about whether or not a copy is allowed to be made, and displays the generated confirmation message on the screen (step S21). For example, a message such as "Game will be copied. OK? ("Yes"/"No")" may be displayed.

Next, the CPU core 21 receives an input from the user which is made in response to the confirmation message (step S22). When the input (e.g., a predetermined key input) from the user is detected, the CPU core 21 determines based on the input content whether or not a copy is to be made (step S23). When a copy is not to be made ("No" in step S23), the CPU core 21 automatically ends the copy process. When a copy is to be made ("Yes" in step S23), the CPU core 21 reads the game PG 171 from the memory card 17 and copies the read game PG 171 into the game PG storage area 371 of the non-volatile memory 37 (step S24).

Next, the CPU core 21 accesses the ID registration area 177 and determines whether or not the accessed ID registration area 177 is writable (step S25). When the ID registration area 177 is writable ("Yes" in step S25), the CPU core 21 reads the main body ID from the main body ID ROM 38 and copies the read main body ID into the ID registration area 177 (step S26). On the other hand, when the ID registration area 177 is unwritable ("No" in step S25), the CPU core 21 ends the copy process without performing the process of step S26. This corresponds to the case where the main body ID is registered in advance or the case where a recopy is made, each through "Setting Menu" as described above.

Referring back to FIG. 12, after the copy process is completed, next, the CPU core 21 determines whether or not the process is completed (step S6). For example, the CPU core 21 determines whether or not a reset button has been pressed. When the process is completed ("Yes" in step S6), the process of the present embodiment ends. On the other hand, when the process is not completed ("No" in step S6), the CPU core 21 executes a startup process for starting up the game PG (step S5). Further, also when it is possible to make a copy from the attached memory card 17 ("No" in step S3), the CPU core 21 executes the startup process.

Figure 15:
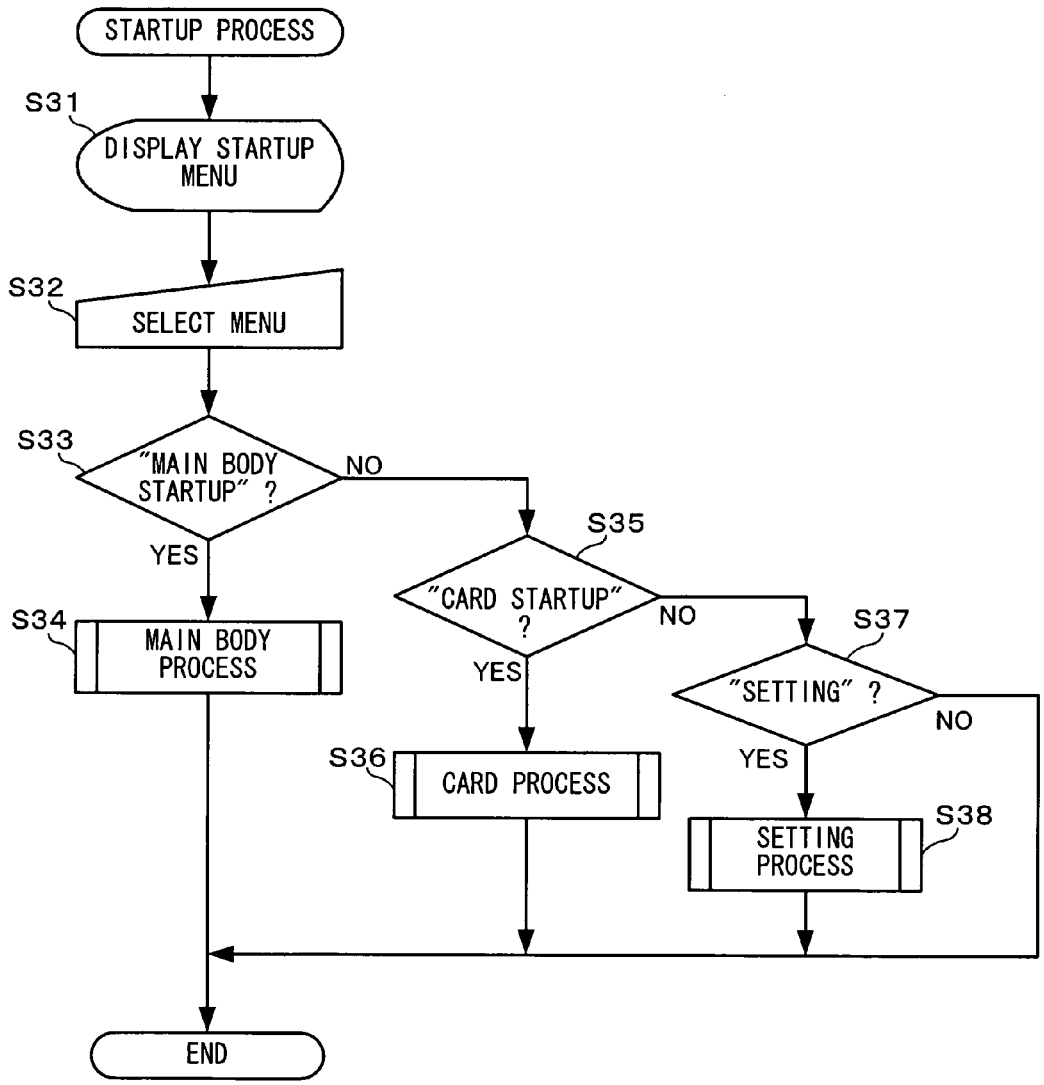
FIG. 15 is a flow chart showing a startup process of step S5 of FIG. 12 in detail.

FIG. 15 is a flow chart showing the startup process of step S5 in detail. Referring to FIG. 15, first, the CPU core 21 displays a startup menu (see FIG. 6) on the screen (step S31). Next, the CPU core 21 receives a selection input made on the startup menu by the user (step S32). When the selection input from the user is detected, the CPU core 21 determines whether or not "Main Body Startup" has been selected from the startup menu (step S33). When "Main Body Startup" has been selected ("Yes" in step S33), the CPU core 21 executes a main body process for starting up the game PG from the non-volatile memory 37 and executing the started up game PG (step S34).

Figure 16:
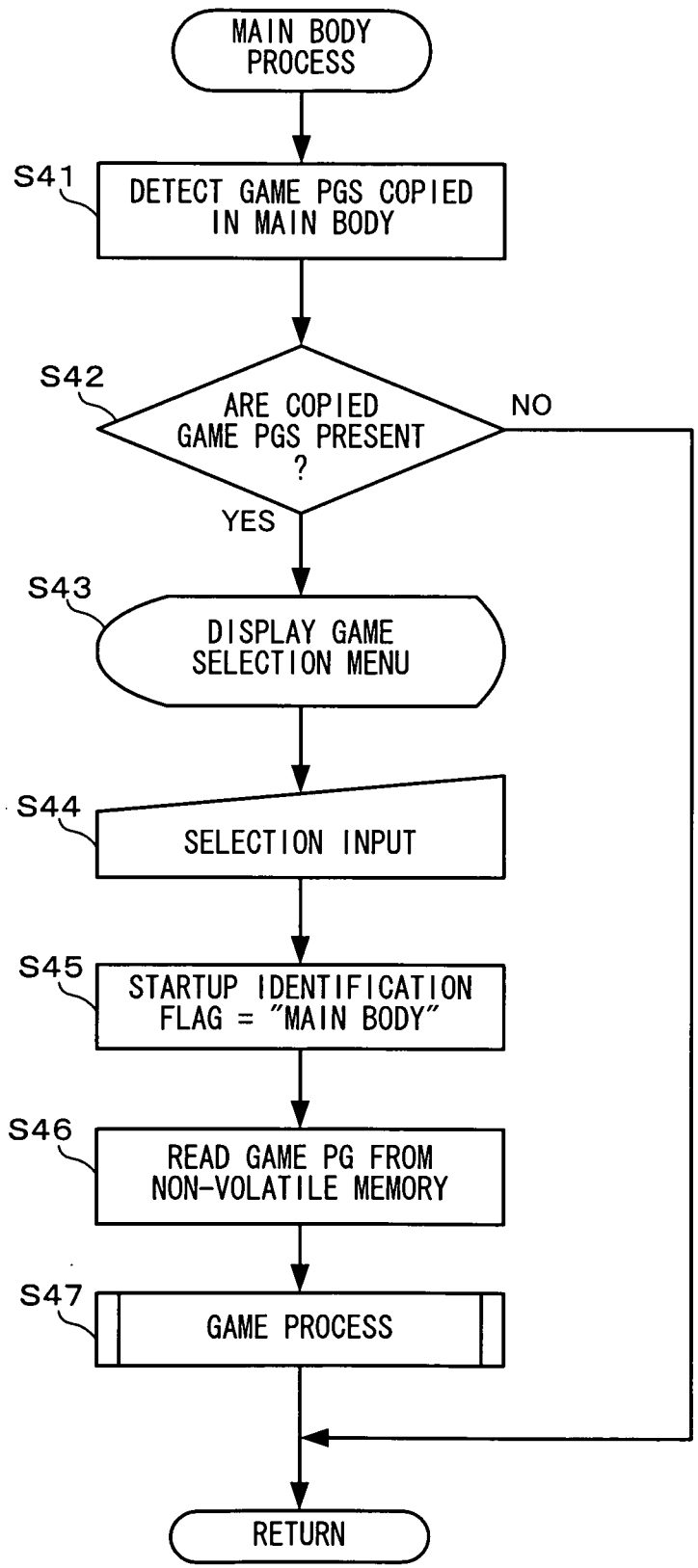
FIG. 16 is a flow chart showing a main body process of step S34 of FIG. 15 in detail.

FIG. 16 is a flow chart showing the main body process of step S34 in detail. Referring to FIG. 16, first, the CPU core 21 accesses the non-volatile memory 37 and detects the copied game PGs (step S41).

Next, as the detection result, the CPU core 21 determines whether or not one or more copied game PGs are present (step S42). When no copied game PG is present ("No" in step S42), the CPU core 21 indicates on the screen that no copied game PG is present, and ends the main body process.

On the other hand, when the copied game PGs are present ("Yes" in step S42), the CPU core 21 reads information regarding the copied game PGs, such as the titles of the games. Then, the CPU core 21 generates the list of the copied game PGs and displays the generated list as a game selection menu on the first LCD 11 (step S43).

Next, the CPU core 21 receives a selection input made on the game selection menu by the user (step S44). When the selection input for selecting any one of the games is detected, the CPU core 21 sets the startup identification flag 241 to "Main Body" (step S45).

Subsequently, the CPU core 21 reads the game PG corresponding to the selected game from the non-volatile memory 37 into the RAM 24 (step S46). Then, the CPU core 21 executes the game PG read into the RAM 24, i.e., starts the game process (step S47). As a result, a game image is displayed on the first LCD 11 via the first GPU 26 (or may be displayed on the second LCD 12 via the second GPU 27), and then the game is started. The contents of the game process vary depending on the startup identification flag 241, and the game process will be described in detail below. The main body process is completed as described above.

Referring back to FIG. 15, when "Main Body Startup" has not been selected from the startup menu ("No" in step S33), the CPU core 21 determines whether or not "Card Startup" has been selected (step S35). When "Card Startup" has been selected ("Yes" in step S35), the CPU core 21 executes a card process for executing the game PG from the memory card 17 (step S36). In the card process, the process of starting up the game PG from the memory card 17 is performed, regardless of whether or not the registration ID is stored in the memory card 17.

Figure 17:
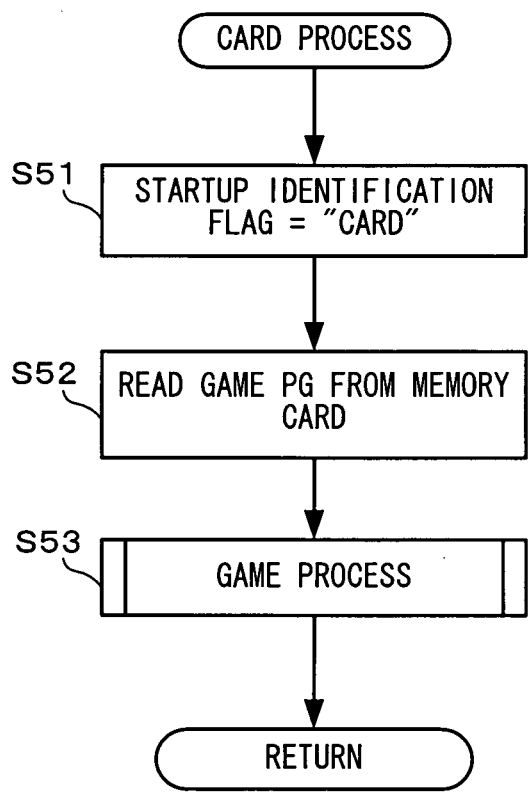
FIG. 17 is a flow chart showing a card process of step S36 of FIG. 15 in detail.

FIG. 17 is a flow chart showing the card process of step S36 in detail. Referring to FIG. 17, first, the CPU core 21 sets the startup identification flag 241 to "Card" (step S51).

Next, the CPU core 21 accesses the memory card 17 and reads the game PG stored in the accessed memory card 17 into the RAM 24 (step S52).

Then, the CPU core 21 executes the game PG read into the RAM 24, i.e., starts the game process (step S53). As a result, a game image is displayed on the first LCD 11 via the first GPU 26, and then the game is started. Similarly to step S47, the contents of the game process vary depending on the startup identification flag 241, and the game process will be described in detail below. The card process is completed as described above.

Referring back to FIG. 15, when "Card Startup" has not been selected from the startup menu ("No" in step S35), the CPU core 21 determines whether or not "Setting" has been selected from the startup menu (step S37). When "Setting" has been selected, the CPU core 21 executes a setting process for performing various processes related to the copy process (step S38).

Figure 18:
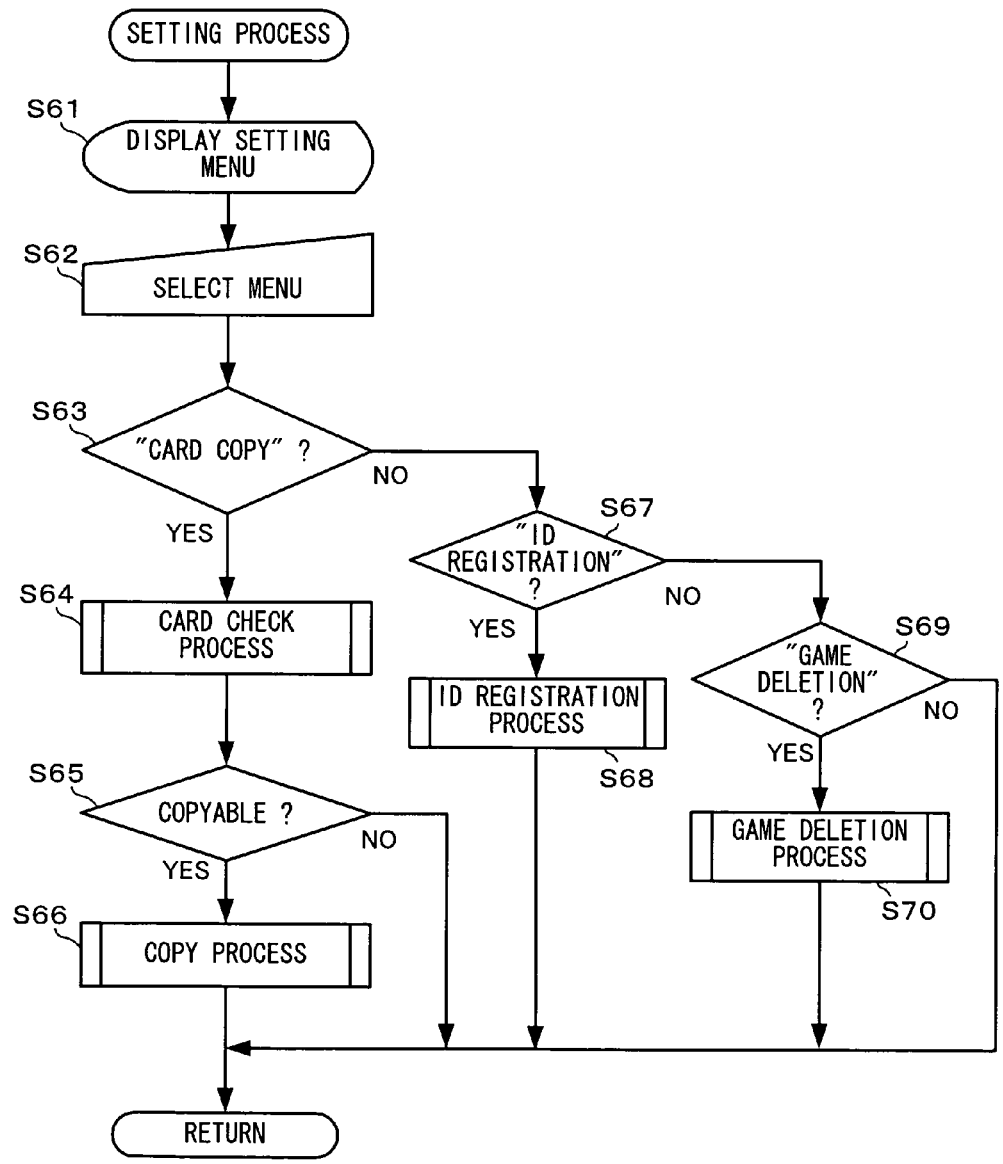
FIG. 18 is a flow chart showing a setting process of step S38 of FIG. 15 in detail.

FIG. 18 is a flow chart showing the setting process of step S38 in detail. Referring to FIG. 18, first, the CPU core 21 displays a setting menu (see FIG. 7) on the screen (step S61).

Next, the CPU core 21 receives a selection input made on the setting menu by the user (step S62).

When the selection input from the user is detected, the CPU core 21 determines whether or not "Card Copy" has been selected from the setting menu (step S63). That is, the CPU core 21 determines whether or not an explicit copy instruction (a manual execution of the copy process) has been given by the user. That is, it is assumed that only the main body ID is registered in advance and thereafter, the game PG is copied, that a recopy is made as described above, and the like. When "Card Copy" has been selected ("Yes" in step S63), the CPU core 21 executes the copy process after checking whether or not it is possible to make a copy from the memory card 17. Specifically, first, the CPU core 21 executes the card check process for checking whether or not it is possible to make a copy from the memory card 17 (step S64). The card check process is similar to the card check process (steps S11 through S15) described above with reference to FIG. 13, and therefore will not be described.

When the card check process of step S64 is completed, next, the CPU core 21 determines, based on the copy flag 242 and similarly to step S3, whether or not it is possible to make a copy from the attached memory card 17 (step S65). As a result of the determination, when it is possible to make a copy from the attached memory card 17 ("Yes" in step S65), the CPU core 21 executes the copy process for copying the game PG from the attached memory card 17 (step S64). The copy process is similar to the copy process (steps S21 through S26) described above with reference to FIG. 14, and therefore will not be described. On the other hand, when it is impossible to make a copy from the attached memory card 17 ("No" in step S65), the CPU core 21 displays on the screen a message that it is impossible to make a copy from the attached memory card 17, and ends the setting process.

On the other hand, when "Card Copy" has not been selected from the setting menu ("No" in step S63), the CPU core 21 determines whether or not "ID Registration" has been selected (step S67). When "ID Registration" has been selected ("Yes" in step S67), the CPU core 21 executes an ID registration process for writing the main body ID into the memory card 17 (step S68).

FIG. 19 is a flow chart showing the ID registration process of step S68 in detail. Referring to FIG. 19, first, the CPU core 21 determines whether or not it is possible to register the main body ID into the attached memory card 17 (step S71). Specifically, the CPU core 21 determines, by determining whether or not the one-time ROM 17c of the memory card 17 is writable, whether or not it is possible to register the main body ID.

As a result of the determination, when it is possible to register the main body ID ("Yes" in step S71), next, the CPU core 21 accesses the main body ID ROM 38 and reads the main body ID from the accessed main body ID ROM 38 (step S72). Subsequently, the CPU core 21 copies the read main body ID into the one-time ROM 17c, i.e., the ID registration area 177, of the memory card 17 (step S73).

On the other hand, when it is impossible to register the main body ID ("No" in step S71), the CPU core 21 displays on the screen a message that the main body ID has already been registered (step S74). The ID registration process is completed as described above.

Referring back to FIG. 18, when "ID Registration" has not been selected from the setting menu ("No" in step S67), the CPU core 21 determines whether or not "Game Deletion" has been selected from the setting menu (step S69). When "Game Deletion" has been selected ("Yes" in step S69), the CPU core 21 executes a game deletion process for deleting the copied game PGs (step S70).

Figure 20:
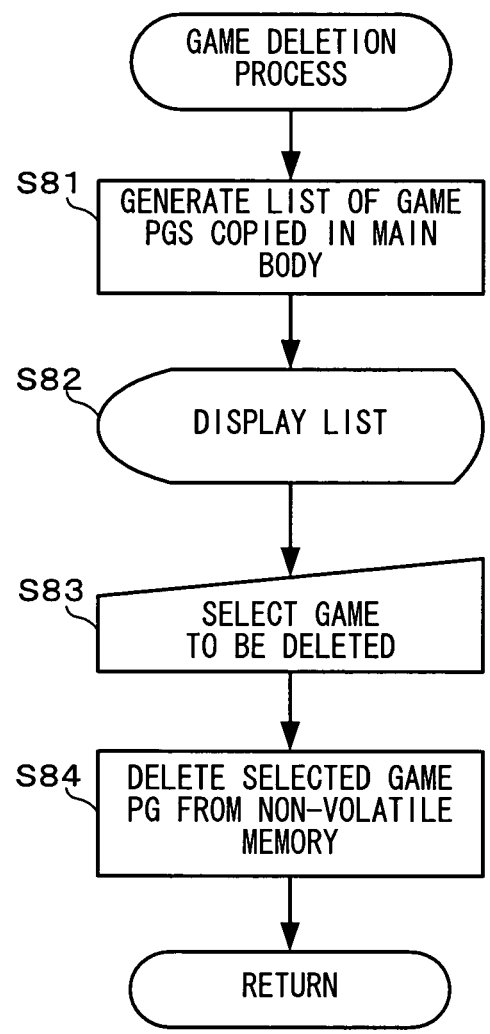
FIG. 20 is a flow chart showing a deletion process of step S70 of FIG. 18 in detail.

FIG. 20 is a flowchart showing the game deletion process of step S70 in detail. Referring to FIG. 20, first, the CPU core 21 accesses the non-volatile memory 37 and acquires information regarding the copied game PGs, such as the titles of the games. Then, the CPU core 21 generates a list capable of showing the acquired information such as the titles of the games in a tabulated manner (step S81). Then, the CPU core 21 displays the generated list as the list of the copied game PGs on the screen (step S82).

Next, the CPU core 21 receives a selection input (i.e., the selection of the game PGs which the user wishes to delete) made on the list by the user (step S83). When the selection input for selecting any one of the games is detected, the CPU core 21 deletes the game PG corresponding to the selected game from the game PG storage area 371 of the non-volatile memory 37 (step S84). The game deletion process is completed as described above.

Referring back to FIG. 18, when "Game Deletion" has not been selected ("No" in step S69), the CPU core 21 automatically ends the setting process. Referring further back to FIG. 15, when the setting process of step S38 is completed, the startup process is also completed. Further, also when it is determined in step S37 that "Setting" has not been selected from the startup menu, the startup process is completed.

Referring back to FIG. 12, after the startup process of step S5 is completed, next, the CPU core 21 determines, as described above, whether or not the process is completed (step S6). Then, when the process is completed ("Yes" in step S6), the process of the present embodiment ends.

Figure 21:
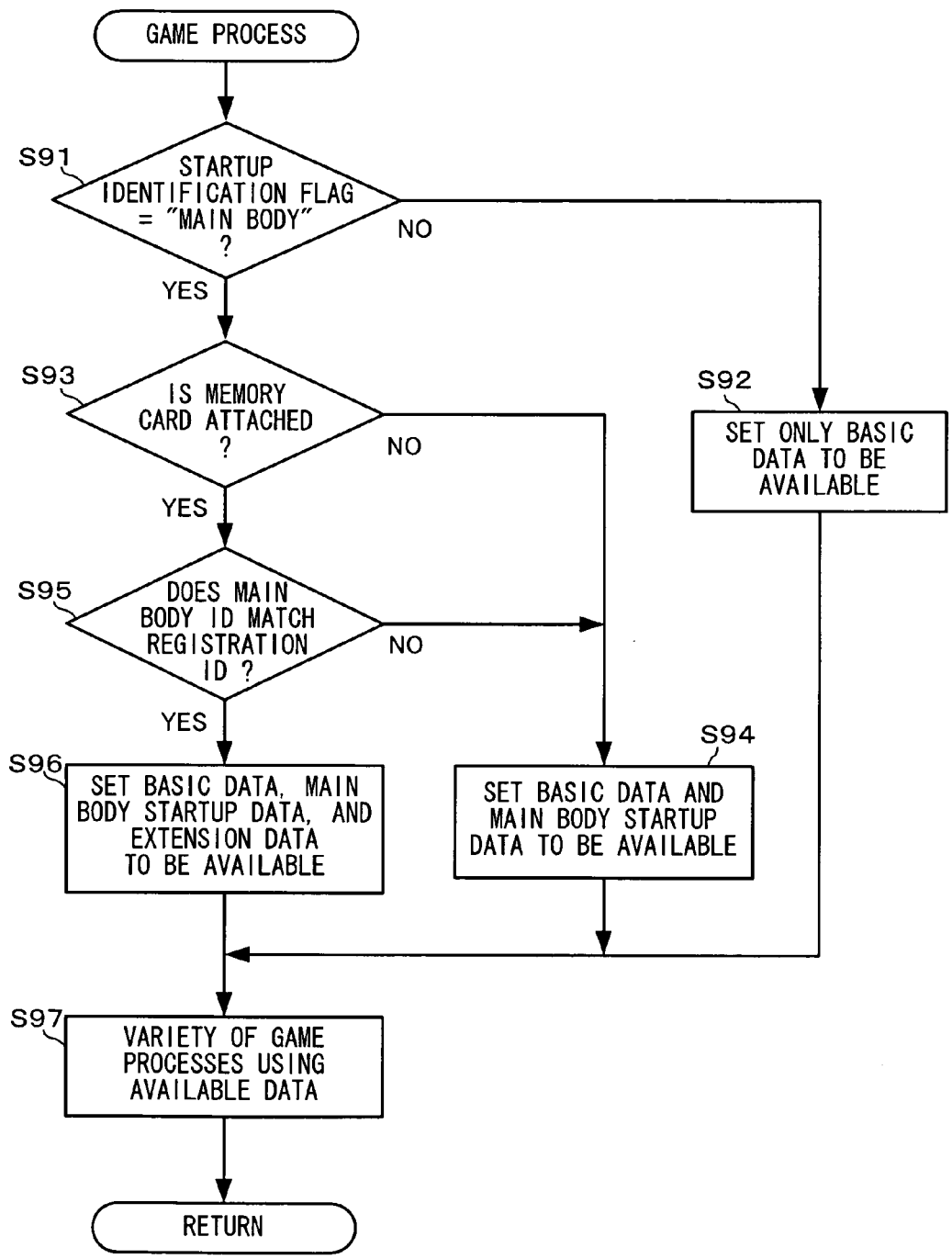
FIG. 21 is a flow chart of a game process of step S47 of FIG. 16 and step S53 of FIG. 17 in detail.

Next, the game process of steps S47 and S53 will be described below. In the game process, data used in the game varies depending on whether the game PG has been started up from the memory card 17 or the game PG copied in the main body has been started up. FIG. 21 is a flow chart showing the game process of steps S47 and S53 in detail. Referring to FIG. 21, first, the CPU core 21 determines whether or not the startup identification flag 241 is set to "Main Body" (step S91). That is, the CPU core 21 determines whether the game PG currently being executed is the game PG started up from the memory card 17 or the game PG copied in the main body and started up.

When the startup identification flag 241 is not set to "Main Body", i.e., when the game PG has been started up from the memory card 17 ("No" in step S91), the CPU core 21 sets, of data read from the data storage area 173 and extended into the RAM 24, only the basic data 174 to be used in the game process (step S92). Note that only the basic data 174 may be read from the memory card 17 into the RAM 24.

On the other hand, when the startup identification flag 241 is set to "Main Body", i.e., when the copied game PG has been started up ("Yes" in step S91), subsequently, the CPU core 21 determines whether or not the memory card 17 of the same game PG as the started up game PG is attached (step S93). As a result of the determination, when the memory card 17 of the same game PG as the started up game PG is not attached ("No" in step S93), the CPU core 21 sets the basic data 174 and the main body startup data 175 to be used in the game process (step S94).

On the other hand, when the memory card 17 of the same game PG as the game PG started up from the main body is attached ("Yes" in step S93), the CPU core 21 determines whether or not the main body ID stored in the main body ID ROM 38 matches the registration ID stored in the attached memory card 17 (step S95). As a result of the determination, when the main body ID does not match the registration ID ("No" in step S95), for example, when the memory card 17 borrowed from a friend is attached, the CPU core 21 executes the process of step S94. That is, the CPU core 21 sets the basic data 174 and the main body startup data 175 to be used in the game process. On the other hand, when the main body ID matches the registration ID ("Yes" in step S95), the CPU core 21 sets the extension data 176, as well as the basic data 174 and the main body startup data 175, to be used in the game process (step S97).

Next, a predetermined game process is executed, using the data set as described above to be used. Consequently, when the game PG has been started up from the memory card 17, the game process using only the basic data 174 is executed. Further, when the game PG has been started up from the main body, the game process using the main body startup data 175 as well as the basic data 174 is executed. Furthermore, when the game PG has been started up from the main body, if the memory card 17 from which the started up game PG has been copied is attached, the game process using the extension data 176 as well as the basic data 174 and the main body startup data 175 is executed. The game process of steps S47 and S53 is completed as described above.

As described above, in the present embodiment, it is possible, by using a one-time ROM, to limit the number of times of making a copy to one time, and it is also possible, even after copying the game PG from the memory card 17, to start up the game PG from the memory card 17 from which the game PG has been copied. That is, even after copying the game PG into the main body of the hand-held game apparatus 10, it is possible to start up the game PG from the memory card 17 alone. Further, it is possible to start up the game PG from the memory card 17, regardless of whether or not the main body ID is stored in the memory card 17. Consequently, it is possible to improve the usability of the memory card 17 and the convenience for the user more than the case where, as is conventionally the case, a medium from which a copy has once been made cannot be used. For example, the user may lend his/her sibling the memory card 17 from which a copy has already been made, and the user and his/her sibling may execute the same game PG, whereby it is possible to perform a communication versus game and the like between the two hand-held game apparatuses 10. That is, it is possible to perform a two-person versus game with one memory card 17.

Further, as described above, the main body startup data 175 may be provided, whereby it is possible to differentiate the contents of the game depending on whether a startup is performed from a card or a startup is performed after a copy. Consequently, it is possible to promote an operation of, for example, copying the game PG into the hand-held game apparatus 10 to enjoy the game.

Further, it is considered that the game PG copied from the memory card 17 is generally started up through "Main Body Startup" and the memory card 17 from which the game PG has been copied will not be attached thereafter. However, the extension data 176 as described above may be provided, whereby it is possible that, for example, when the game PG is started up from the main body which, by chance, has attached thereto the memory card 17 from which the game PG has been copied, a "hidden character" and a "hidden item" which do not normally appear in the game. Consequently, it is possible to make the game more interesting.

Note that in the above-described embodiment, when the copied game PG is started up, the list of the copied game PGs is displayed for the user to make a selection, but the present invention is not limited thereto, and the user may set in advance the game PG to be started up. For example, in the setting menu (see FIG. 7) displayed in step S61, an item "Priority Startup" may be provided to allow the user to register the game PG to be started up by priority. Then, when the user starts up the game PG through "Main Body Startup", the selection screen may not be displayed and the game PG registered through "Priority Startup" may be started up. Further, also when only one copied game PG is present, the selection screen may not be displayed and the only one copied game PG may be started up. Furthermore, it may be possible to set to which one of "Main Body Startup" and "Card Startup" is to be started up by priority. For example, when the memory card 17 is attached, "Startup Menu" may not be displayed and the game PG may always be started up from the memory card 17. In each case, it is possible to omit the operation of selecting a startup medium, and thus it is possible to improve the convenience for the user.

Further, in the above-described embodiment, as for the main body ID, the game apparatuses are shipped in the state where an ID unique to each game apparatus main body is assigned thereto and stored in the main body ID ROM 38 thereof, but the present invention is not limited thereto. When the hand-held game apparatus 10 has been started up for the first time, the main body ID may be generated using a random number and stored into the non-volatile memory 37, not into the main body ID ROM 38. If the digit number of the main body ID is set to be large, the main body ID is unlikely to overlap that of another game apparatus even when generated in a random manner. Consequently, the main body ID may be generated at the first startup, whereby it is not necessary to manage the main body ID to be uniquely assigned when the game apparatus is manufactured.

Further, in steps S2 and S3, the determinations of whether or not it is possible to make a copy may not be made by a process using the characteristics of a one-time ROM, but may be made by a process performed in a software manner. For example, the ID registration area 177 is provided in the RAM 17b, not the one-time ROM 17c, of the memory card 17. Then, in the default settings, the value of all "f"s (e.g., "ffffffff" in the case of 8-digit data) is set as a so-called "virgin code" in the ID registration area 177 in advance. Then, it is determined in step S12 whether or not the data of the ID registration area 177 indicates all "f"s. When the data indicates all "f"s, the copy flag 242 may be set to "OK". When the data does not indicate all "f"s, the copy flag 242 may be set to "NG".

Further, in the above-described embodiment, as for the registration of the main body ID, for example, when, in response to the inquiry of steps S21 through S23 about whether or not a copy is to be made, the user selects that a copy is not to be made, the copy process ends without even registering the main body ID. However, even when the user selects that a copy is not to be made, only the main body ID may be registered into the memory card 17.

Further, once the user selects that a copy is not to be made, the copy process may not be automatically executed thereafter. That is, once the user selects that a copy is not to be made, the process of steps S2, S3, and S4 of FIG. 12 may not be executed. For example, in the copy process, when, in response to the confirmation message of step S21, the user selects that a copy is not to be made, information that the inquiry about whether or not a copy is to be made from the memory card 17 has once been made, may be stored into the startup history 373 of the non-volatile memory 37. Then, in the process of the IPL of step S1, the CPU core 21 may access the startup history 373 and determine whether or not the user has once selected that a copy is not to be made. Note that when the user wishes to execute the copy process in this case, it is possible to make a copy by selecting "Card Copy" from "Setting Menu".

Further, in the above-described embodiment, when the memory card 17 from which a copy has not yet been made, e.g., immediately after purchase, is attached, the copy process is automatically executed, but the present invention is not limited thereto. The copy process may not be automatically executed and may always be executed by the user's explicit instruction (i.e., manually). In the above-described embodiment, the copy confirmation message is displayed even when the copy process is automatically executed, and thus it is possible to more certainly prevent the game PG from being accidentally copied.

Further, a plurality of (e.g., three) ID registration areas 177 may be provided in the memory card 17 such that copies can be made from the memory card 17 to up to three different hand-held game apparatuses 10. Consequently, it is possible to improve the convenience for the user.

Further, when the game PG is copied, not a simple copy but an installation (i.e., a copy including a certain setting for the execution of the game PG) may be made.

Further, in the above-described embodiment, the game process is taken as an example of information processing, but the present invention is not limited thereto and may be applied to other types of information processing.

While the invention has been described in detail, the foregoing description is in all aspects illustrative and not restrictive. It is understood that numerous other modifications and variations can be devised without departing from the scope of the invention.

What is claimed is:

1. An information processing system comprising a program storage medium and an information processing apparatus main body capable of attaching the program storage medium thereto, the program storage medium comprising:
  a master program storage unit for storing a program therein; and
  an ID registration area for storing therein a main body ID which is an ID unique to the information processing apparatus, and the information processing apparatus comprising:
  an attaching unit for attaching the program storage medium thereto;
  a main body ID storage unit having the main body ID stored therein;
  a copy program storage unit for storing in a nonvolatile memory therein as a copy program, the program stored in the master program storage unit;
  a copyability determining unit for determining whether or not the main body ID is stored in the ID registration area of the program storage medium attached to the attaching unit;
  a copying unit for copying the program stored in the master program storage unit into the copy program storage unit when the copyability determining unit determines that the main body ID is not stored;
  a main body ID registering unit for reading the main body ID from the main body ID storage unit and storing the read main body ID into the ID registration area, in tandem with the copying unit making the copy when the copyability determining unit determines that the main body ID is not stored;
  an execution program selecting unit for selecting, from the program copied in the copy program storage unit and from the program stored in the master program storage unit of the program storage medium attached to the attaching unit, a program to be executed; and
  an executing unit for executing the program selected by the execution program selecting unit,
  wherein when it is determined that a second main body ID, different from the main body ID, is stored in the ID registration area, the program stored in the master program storage unit cannot be copied into the copy program storage unit of the information processing apparatus, but the program can still be executed from the master program storage unit of the program storage medium.

2. The information processing system according to claim 1, wherein the ID registration area allows the main body ID to be stored thereinto only once.

3. The information processing system according to claim 1, wherein the information processing apparatus further comprises an ID matching determining unit for determining whether or not the main body ID stored in the ID registration area matches the main body ID stored in the main body ID storage unit, and wherein the copying unit copies the program stored in the master program storage unit into the copy program storage unit when the ID matching determining unit determines that the main body IDs match each other.

4. The information processing system according to claim 1, wherein the main body ID registering unit reads the main body ID from the main body ID storage unit and allows the read main body ID to be stored into the ID registration area, regardless of whether or not the copying unit makes the copy when the copyability determining unit determines that the main body ID is not stored.

5. The information processing system according to claim 1, wherein the program storage medium further comprises a dedicated data storage unit for storing thereinto dedicated data which is data used, only when the program copied in the copy program storage unit has been started up, for information processing executed by the started up program, wherein the information processing apparatus further comprises a startup form determining unit for determining whether the program has been started up from the program storage medium or from the copy program storage unit, and wherein the executing unit executes the program using the dedicated data only when the startup form determining unit determines that the program has been started up from the copy program storage unit.

6. The information processing system according to claim 1, wherein the program storage medium further comprises an extension data storage unit for storing thereinto extension data which is data used, only when a predetermined condition is satisfied, by the program, wherein the information processing apparatus further comprises:

a startup form determining unit for determining whether the program has been started up from the program storage medium or from the copy program storage unit; and an attachment detecting unit for, when the startup form determining unit determines that the program has been started up from the copy program storage unit, detecting whether or not the program storage medium is attached to the attaching unit, and wherein the executing unit executes the program using the extension data only when the attachment detecting unit detects that the program storage medium is attached.

7. The information processing system according to claim 1, wherein the information processing apparatus further comprises a communication unit for communicating with another information processing apparatus, and wherein a predetermined process is executed by performing communication via the communication unit between the program started up from the program storage medium attached to the information processing apparatus and the program started up from the copy program storage unit of said another information processing apparatus.

8. An information processing apparatus capable of attaching thereto a program storage medium including an ID registration area for storing therein a main body ID which is an ID unique to the information processing apparatus and also including a master program storage area having a program stored therein, the information processing apparatus comprising:

an attaching unit for attaching the program storage medium thereto;

a main body ID storage unit having the main body ID stored therein;

a copy program storage unit for storing in a nonvolatile memory therein the program stored in the master program storage area;

a copyability determining unit for determining whether or not the main body ID is stored in the ID registration area of the program storage medium attached to the attaching unit;

a copying unit for copying the program stored in the master program storage area into the copy program storage unit when the copyability determining unit determines that the main body ID is not stored;

a main body ID registering unit for reading the main body ID from the main body ID storage unit and storing the read main body ID into the ID registration area, in tandem with the copying unit making the copy when the copyability determining unit determines that the main body ID is not stored;

an execution program selecting unit for selecting, from the program copied in the copy program storage unit and from the program stored in the program storage medium attached to the attaching unit, a program to be executed; and an executing unit for executing the program selected by the execution program selecting unit, wherein when it is determined that a second main body ID, different from the main body ID, is stored in the ID registration area, the prow,rn stored in the master program storage unit cannot be copied into the copy program storage unit of the information processing apparatus, but the program can still be executed from the master program storage unit of the program storage medium.

9. A non-transitory computer-readable storage medium having stored therein an information processing program to be executed by a computer of an information processing apparatus capable of attaching thereto a program storage medium including an ID registration area for storing therein a main body ID which is an ID unique to the information processing apparatus and also including a master program storage area having a program stored therein, the computer-readable storage medium causing the computer to execute instructions comprising:

determining whether or not the main body ID is stored in the ID registration area of the attached program storage medium;

copying the program stored in the master program storage area into a nonvolatile memory of a storage device incorporated in the information processing apparatus when it is determined that the main body ID is not stored;

storing the main body ID of the information processing apparatus into the ID registration area, in tandem with making the copy when it is determined that the main body ID is not stored;

selecting, from the program copied in the storage device incorporated in the information processing apparatus and from the program stored in the master program storage area of the attached program storage medium, a program to be executed; and executing the selected program, wherein when it is determined that a second main body ID, different from the main body ID, is stored in the ID registration area, the program stored in the master proaram storage unit cannot be copied into the copy program storage unit of the information processing apparatus, but the program can still be executed from the master program storage unit of the program storage medium.

10. An information processing system comprising a program storage medium and an information processing apparatus main body capable of attaching the program storage medium thereto, the program storage medium comprising:

a master program storage unit for storing a predetermined program therein; and an ID registration area for storing therein a main body ID which is an ID unique to the information processing apparatus, and the information processing apparatus comprising:

an attaching unit for attaching the program storage medium thereto;

a main body ID storage unit having the main body ID stored therein;

a copy program storage unit for storing in a nonvolatile memory therein as a copy program, the program stored in the master program storage unit;

a copyability determining unit for determining whether or not copying is possible, on the basis of a stored state of the ID registration area of the program storage medium attached to the attaching unit;

a copying unit for copying the program stored in the master program storage unit into the copy program storage unit in accordance with a result of the determination of the copyability determining unit;

a main body ID registering unit for storing the main body ID stored in the main body ID storage unit into the ID registration area when the copyability determining unit determines that copying is possible; and an executing unit capable of executing the program copied in the copy program storage unit, and capable of executing the program stored in the master program storage unit of the program storage medium attached to the attaching unit even when the program stored in the master program storage unit is prevented from being copied into the copy program storage unit when a main body ID of an information processing apparatus other than the own information processing apparatus is stored in the ID registration area of the program storage medium.

11. An information processing apparatus capable of attaching thereto a program storage medium including an ID registration area for storing therein a main body ID which is an ID unique to the information processing apparatus and also including a master program storage unit having a program stored therein, the information processing apparatus comprising:

an attaching unit for attaching the program storage medium thereto;

a main body ID storage unit having the main body ID stored therein;

a copy program storage unit for storing in a nonvolatile memory therein as a copy program, the program stored in the master program storage unit;

a copyability determining unit for determining whether or not copying is possible, on the basis of a stored state of the ID registration area of the program storage medium attached to the attaching unit;

a copying unit for copying the program stored in the master program storage unit into the copy program storage unit in accordance with a result of the determination of the copyability determining unit;

a main body ID registering unit for storing the main body ID stored in the main body ID storage unit into the ID registration area when the copyability determining unit determines that copying is possible; and an executing unit capable of executing the program copied in the copy program storage unit, and capable of executing the program stored in the master program storage unit of the program storage medium attached to the attaching unit even when the program stored in the master program storage unit is prevented from being copied into the copy program storage unit when a main body ID of an information processing apparatus other than the own information processing apparatus is stored in the ID registration area of the program storage medium.

12. A non-transitory computer-readable storage medium having stored therein an information processing program to be executed by a computer of an information processing apparatus capable of attaching thereto a program storage medium including an ID registration area for storing therein a main body ID which is an ID unique to an information processing apparatus and also including a master program storage unit having a program stored therein, the computer-readable storage medium causing the computer to execute instructions comprising:

determining whether or not copying is possible, on the basis of a stored state of the ID registration area of the attached program storage medium;

copying the program stored in the master program storage unit into a nonvolatile memory of a copy program storage unit in the information processing apparatus in accordance with a result of the determination;

storing the main body ID stored in a main body ID storage unit of the information processing apparatus into the ID registration area when copying is possible; and configuring the information processing apparatus to be capable of executing the program copied in the copy program storage unit, and configuring the information processing apparatus to be capable of executing the program stored in the master program storage unit of the attached program storage medium even when the program stored in the master program storage unit is prevented from being copied into the copy program storage unit when a main body ID of an information processing apparatus other than the own information processing apparatus is stored in the ID registration area of the program storage medium.

13. An information processing system comprising a program storage medium and an information processing apparatus main body capable of attaching the program storage medium thereto, the program storage medium comprising:
a master program storage unit for storing a predetermined program therein; and
an ID registration area for storing therein a main body ID which is an ID unique to the information processing apparatus, and the information processing apparatus comprising:
an attaching unit for attaching the program storage medium thereto;
a main body ID storage unit having the main body ID stored therein;
a copy program storage unit for storing in a nonvolatile memory therein as a copy program, the program stored in the master program storage unit;
a copyability determining unit for determining whether or not copying is possible, on the basis of a stored state of the ID registration area of the program storage medium attached to the attaching unit;
a copying unit for copying the program stored in the master program storage unit into the copy program storage unit in accordance with a result of the determination of the copyability determining unit;
a main body ID registering unit for storing the main body ID stored in the main body ID storage unit into the ID registration area when the copyability determining unit determines that copying is possible; and
an executing unit capable of executing the program copied in the copy program storage unit, and capable of executing the program stored in the master program storage unit of the program storage medium attached to the attaching unit even when the program stored in the master program storage unit is prevented from being copied into the copy program storage unit when the main body ID of the information processing apparatus is not stored in the ID registration area of the program storage medium.

* * * * *